(12) United States Patent
Chapman

(10) Patent No.: US 7,349,430 B1
(45) Date of Patent: Mar. 25, 2008

(54) ADDRESSING SCHEME IMPLEMENTED IN ACCESS NETWORKS

(75) Inventor: John T. Chapman, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1154 days.

(21) Appl. No.: 09/895,809

(22) Filed: Jun. 27, 2001

(51) Int. Cl.
*H04J 3/16* (2006.01)
*H04J 3/26* (2006.01)
*H04L 12/28* (2006.01)
*H04N 1/173* (2006.01)

(52) U.S. Cl. ............... 370/468; 370/432; 370/390; 725/114; 725/117

(58) Field of Classification Search ........ 370/468, 370/395.1, 395.64, 329, 337, 321, 395.41, 370/477, 478, 392, 389, 395.3, 487, 390, 370/432; 725/117, 105, 110, 111, 114
See application file for complete search history.

(56) References Cited

U.S. PATENT DOCUMENTS

| | | |
|---|---|---|
| 5,384,563 A | 1/1995 | Massey |
| 5,414,704 A | 5/1995 | Spinney |
| 5,488,412 A | 1/1996 | Majeti et al. |
| 5,506,987 A | 4/1996 | Abramson et al. |
| 5,586,121 A | 12/1996 | Moura et al. |
| RE35,774 E | 4/1998 | Moura et al. |
| 5,751,220 A | 5/1998 | Ghaffari |
| 5,784,597 A | 7/1998 | Chiu et al. |
| 5,790,806 A | 8/1998 | Koperda |
| 5,818,845 A | 10/1998 | Moura et al. |
| 5,828,655 A | 10/1998 | Moura et al. |
| 5,854,793 A | 12/1998 | Dinkins |
| 5,859,852 A | 1/1999 | Moura et al. |
| 5,872,773 A | 2/1999 | Katzela et al. |
| 5,892,903 A | 4/1999 | Klaus |
| 5,933,420 A | 8/1999 | Jaszewski et al. |
| 5,946,047 A | 8/1999 | Levan |
| 5,946,048 A | 8/1999 | Levan |
| 5,950,205 A | 9/1999 | Aviani, Jr. |
| 5,953,335 A | 9/1999 | Erimli et al. |
| 5,956,346 A | 9/1999 | Levan |
| 5,959,660 A | 9/1999 | Levan |

(Continued)

FOREIGN PATENT DOCUMENTS

WO    WO98/31107    7/1998

OTHER PUBLICATIONS

Cable Television Laboratories, Inc., Interim Specification, "Data-Over-Cable Service Interface Specifications, Radio Frequency Interface Specification, SP-RFIv1.1-I02-990731," Jul. 30, 1999, 352 Pages.

(Continued)

*Primary Examiner*—Hanh Nguyen
(74) *Attorney, Agent, or Firm*—Dean E. Wolf; Beyer Weaver LLP

(57) ABSTRACT

An improved addressing scheme is disclosed for use in access networks. According to a specific embodiment, upstream and/or downstream channels may be grouped together based upon logical associations rather than physical associations. Further, according to at least one embodiment of the present invention, various techniques are described for routing selected channel MAP messages to appropriate channels and/or nodes within the access network.

25 Claims, 15 Drawing Sheets

| | | | |
|---|---|---|---|
| 451→ US1 | Slot 1 | Port 1 | SID 0-7999 |
| 453→ US2 | Slot 1 | Port 2 | SID 0-7999 |
| US3 | Slot 1 | Port 3 | SID 0-7999 |
| US4 | Slot 1 | Port 4 | SID 0-7999 |
| 455→ US5 | Slot 2 | Port 1 | SID 0-7999 |
| US6 | Slot 2 | Port 2 | SID 0-7999 |
| US7 | Slot 2 | Port 3 | SID 0-7999 |
| ⋮ | ⋮ | ⋮ | ⋮ |

↖ 450

U.S. PATENT DOCUMENTS

| | | | |
|---|---|---|---|
| 5,959,968 | A | 9/1999 | Chin et al. |
| 5,959,997 | A | 9/1999 | Moura et al. |
| 5,963,557 | A * | 10/1999 | Eng .................... 370/432 |
| 5,989,060 | A | 11/1999 | Coile et al. |
| 6,006,266 | A | 12/1999 | Murphy et al. |
| 6,016,388 | A | 1/2000 | Dillon |
| 6,052,718 | A | 4/2000 | Gifford |
| 6,137,793 | A * | 10/2000 | Gorman et al. ............. 370/360 |
| 6,345,294 | B1 | 2/2002 | O'Toole et al. |
| 6,370,159 | B1 | 4/2002 | Eidson |
| 6,459,703 | B1 | 10/2002 | Grimwood et al. |
| 6,467,091 | B1 * | 10/2002 | Lin et al. .................... 725/126 |
| 6,510,162 | B1 | 1/2003 | Fijolek et al. |
| 6,693,878 | B1 * | 2/2004 | Daruwalla et al. .......... 370/235 |
| 6,785,292 | B1 * | 8/2004 | Vogel ......................... 370/433 |
| 6,857,132 | B1 | 2/2005 | Rakib et al. |
| 6,917,591 | B2 * | 7/2005 | St. John ..................... 370/235 |
| 6,917,614 | B1 * | 7/2005 | Laubach et al. ............ 370/392 |
| 2002/0136203 | A1 | 9/2002 | Liva et al. |
| 2005/0018697 | A1 | 1/2005 | Enns et al. |

OTHER PUBLICATIONS

3COM, "High-speed Cable Internet Solutions," http://3com.com/cablenow/pdf/7125dsht.pdf, 4 pages (Dec. 1999).

Data Over Cable Service Interface Specification, SP-RFI-I04-980724, Jul. 24, 1998 (208 pages).

U.S. Appl. No. 60/159,085, filed Oct. 13, 1999.

U.S. Appl. No. 09/490,761, filed Jan. 24, 2000.

U.S. Appl. No. 09/606,503, filed Jun. 28, 2000.

U.S. Appl. No. 09/490,761, Office Action Dated Jun. 18, 2003.

U.S. Appl. No. 09/490,761, Final Office Action Dated Nov. 19, 2003.

U.S. Appl. No. 09/606,503, Office Action dated Jun. 27, 2005.

U.S. Appl. No. 09/606,503, Office Action dated Nov. 29, 2005.

Eager et al., "Adaptive Load Sharing in Homogeneous Distributed Systems," IEEE, Transactions on Software Engineering, vol. Se-12, No. 5, May 1986, pp. 662-675.

Akamai Technologies, Inc. -Global Internet Content Delivery-"How FreeFlow Works," webmaster@akamai.com 1999-2000.

Digital Island, Inc. -e-Business Without Limits-, "Enabling Technologies," http://www.digisle.net, no date.

Internap, "Preferred Collocation Services," http://www.internap.com Copyright © 2001 Internap Network Services Corporation.

Meyer, et al., Request For Comments No. 2026, entitled, "Generic Routing Encapsulation (GRE)," Jan. 2000, Internet Engineering Task Force, 9 pages.

Mockapetris, P., Request For Comments No. 1034, entitled, "Domain Names—Concepts and Facilities," Nov. 1987, Internet Engineering Task Force, 31 pages.

Information Sciences Institute, Request for Comments No. 793, entitled, "Transmission Control Protocol—DARPA Internet Program—Protocol Specification," Sep. 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Appl. No. 60/160,535, filed Oct. 20, 1999, 127 Pages.

Lu et al., "Method and Apparatus for Automatic Network Address Assignment," U.S. Appl. No. 60/178,063, filed Jan. 24, 2000, 74 Pages.

Johnson et al., "Method and Apparatus for Determining a Network Topology in the Presence of Network Address Translation," U.S. Appl. No. 60/178,062, filed Jan. 24, 2000, 32 Pages.

Toole et al., "Fast-Changing Network Status and Load Monitoring and Feedback," U.S. Appl. No. 60/177,985, filed Jan. 25, 2000, 20 Pages.

Kirk Johnson, "A Method and Apparatus for Minimalist Approach to Implementing Server Selection," U.S. Appl. No. 60/177,415, filed Jan. 21, 2000, 39 Pages.

U.S. Appl. No. 09/490,761, now U.S. Patent No. 7,065,779, Notice of Allowance dated Nov. 28, 2005.

U.S. Appl. No. 09/606,503, now U.S. Patent No. 7,113,484, Notice of Allowance mailed on Apr. 20, 2006.

U.S. Appl. No. 09/894,852, now U.S. Patent No. 7,085,287, filed on Jun. 27, 2001.

U.S. Appl. No. 09/894,852, now U.S. Patent No. 7,085,287, Office Action dated Oct. 4, 2005.

U.S. Appl. No. 09/894,852, now U.S. Patent No. 7,085,287, Notice of Allowance mailed on Mar. 7, 2006.

\* cited by examiner

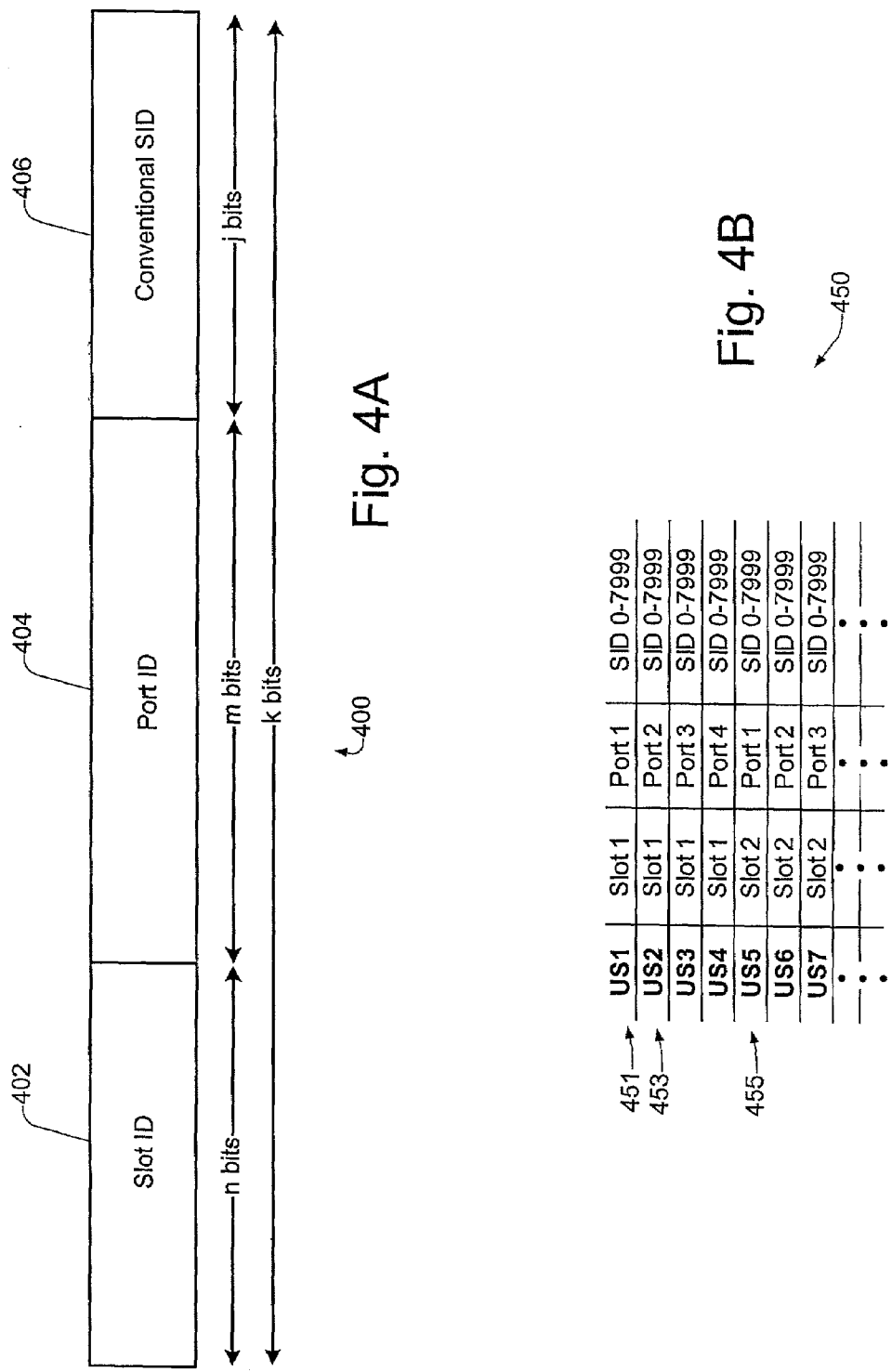

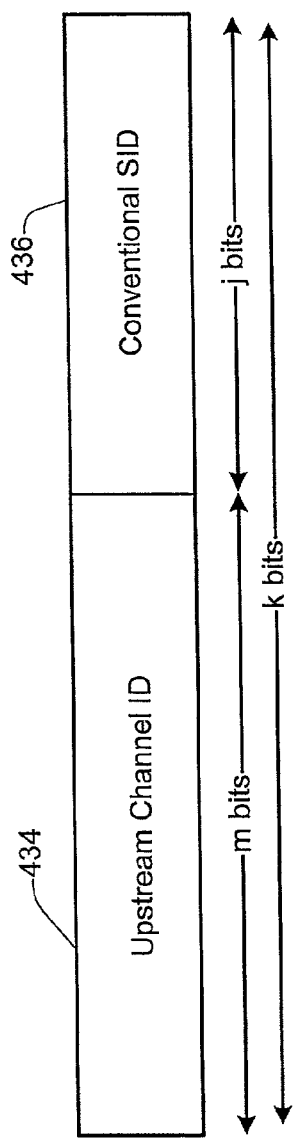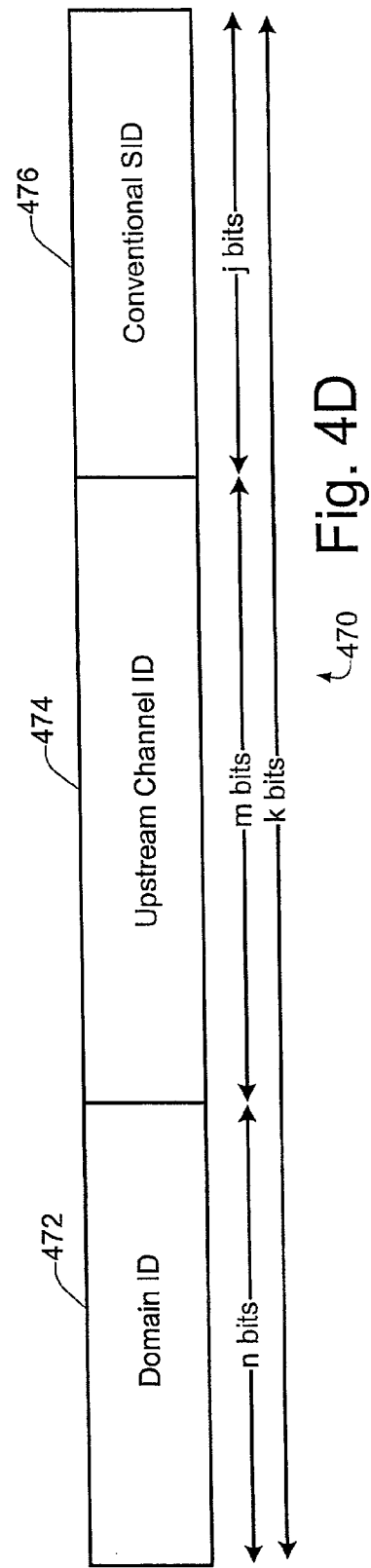

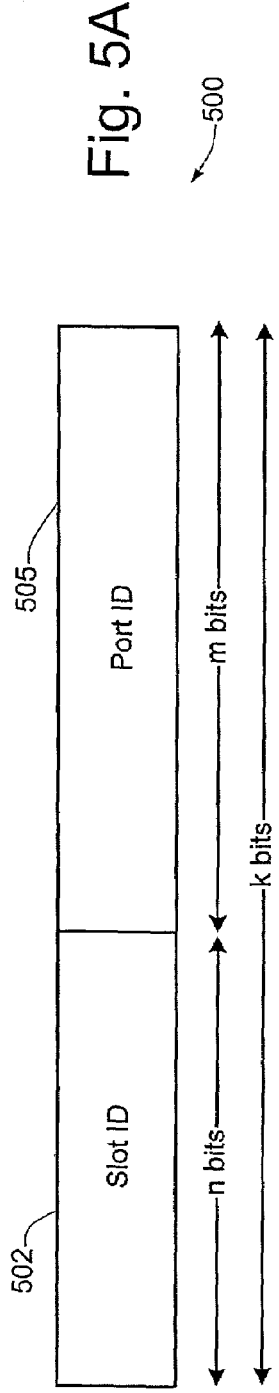
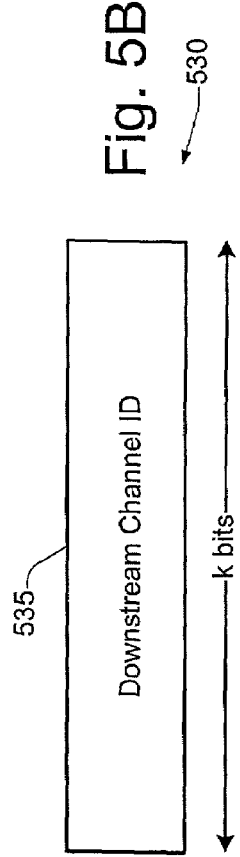
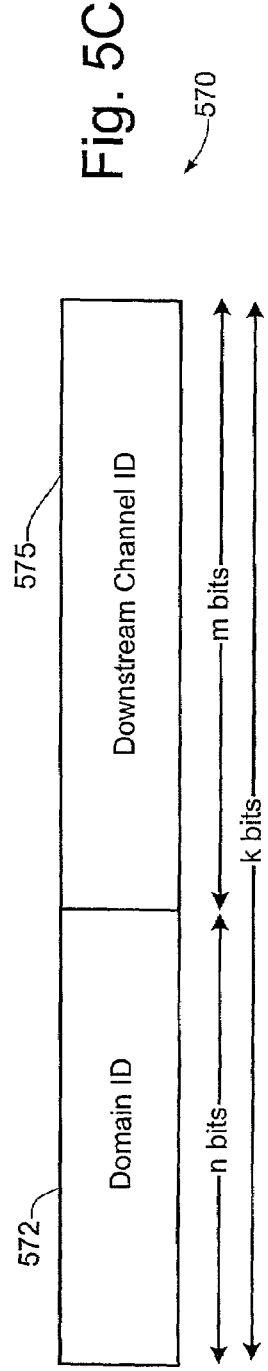

Fig. 6B Membership Table

Fig. 6C ActivityTable

ADDRESSING SCHEME IMPLEMENTED IN ACCESS NETWORKS

RELATED APPLICATION DATA

The present application is related to U.S. patent application Ser. No. 09/490,761, filed on Jan. 24, 2000, and U.S. patent application Ser. No. 09/606,503, filed Jun. 28, 2000, which claims priority under 35 USC 119(e) from U.S. Provisional Patent Application Ser. No. 60/159,085, filed on Oct. 13, 1999. The present invention is also related to U.S. patent application Ser. No. 09/894,852, filed concurrently herewith, naming Chapman as inventor, and entitled, "MAP ROUTING TECHNIQUE IMPLEMENTED IN ACCESS NETWORKS" now U.S. Pat. No. 7,085,287, issued Aug. 1, 2006. Each of these patent applications is incorporated herein by reference in their entirety for all purposes.

BACKGROUND OF THE INVENTION

This invention relates to digital computer network technology. More specifically, it relates to methods and apparatus for implementing a new addressing scheme for nodes of an access network.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services.

FIG. 1 shows a block diagram of a conventional two-way hybrid fiber-coaxial (HFC) cable network 100. As shown in FIG. 1, the cable network 100 includes a Head End complex 102 typically configured to service about 40,000 homes. The Head End complex 102 may include a plurality of components and/or systems (not shown) such as, for example, a Head End, a super Head End, a hub, a primary hub, a second hub, etc. Additionally, as shown in FIG. 1, the Head End complex 102 typically includes a Cable Modem Termination System (CMTS). Primary functions of the CMTS include (1) receiving data inputs from external sources 100 and converting the data for transmission over the cable plant; (2) providing appropriate Media Access Control (MAC) level packet headers for data received by the cable system, and (3) modulating and demodulating the data to and from the cable network. Typically, the Head End complex 102 is configured to provide a communication interface between nodes (e.g. cable modems) in the cable network and external networks such as, for example, the Internet. The cable modems typically reside at the subscriber premises 110A-D.

The Head End Complex 102 is typically connected to one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the Head End Complex 102 and the plurality of cable modems residing at the plurality of subscriber groups 110.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-I06-001215, Dec. 15, 2000). That document is incorporated herein by reference for all purposes.

Communication between the Head End Complex 102 and fiber node 106a is typically implemented using modulated optical signals which travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the Head End Complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems residing at subscriber premises 110A-D. According to the DOCSIS standard, specific frequency ranges are used for transmitting downstream information from the CMTS to the cable modems, and other specific frequency ranges are used for transmitting upstream information from the cable modems to the CMTS.

Typically, digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End Complex of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

Data Communication in Cable Networks

In conventional DOCSIS systems, the CMTS may include a plurality of physically distinct line cards having appropriate hardware for communicating with cable modems in the network. Due to physical constraints, the upstream and downstream channels physically associated with a particular Line Card are typically grouped together and defined as one or more separate DOCSIS domains. Typically, each line card is pre-configured or pre-packaged to include the necessary hardware to enable that line card to provide a fixed number of upstream and/or downstream channels. For example, a typical line card configuration will include a single downstream transmitter (for the downstream channel) and one or more upstream receivers (for the upstream channels). The downstream channel is used by the CMTS to broadcast data to all cable modems (CMs) within that particular domain. Only the CMTS may transmit data on the downstream.

In order to allow the cable modems of a particular DOCSIS domain to transmit data to the CMTS, the cable modems share one or more upstream channels within that domain. Access to the upstream channel is controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timestamp counter, which, according to conventional implementations is a 32-bit counter that increments by one every clock pulse.

Because each line card is pre-configured to include a fixed number of upstream and/or downstream channels, the upstream and downstream channels of conventional HFC networks are conventionally grouped together based upon their physical associations. Thus, for example, if a conventional line card has been pre-configured to include one downstream channel and four upstream channels, a conventional DOCSIS-enabled HFC network will typically define a single DOCSIS domain as corresponding to the one downstream and four upstream channels which are physically associated with the 1×4 line card. Cable modems belonging to this DOCSIS domain are constrained to use only the upstream and downstream channels associated with this DOCSIS domain, and are therefore bandwidth limited. Moreover, it will be appreciated that each line card has a fixed amount of resources based on its particular hardware configuration. Because of this, it is not possible to add additional upstream or downstream channels to an existing line card residing within the CMTS without physically modifying the hardware configuration of that line card.

In conventional DOCSIS-enabled HFC networks, a defined DOCSIS domain will typically not include upstream and/or downstream channels from different line cards. One reason why conventional DOCSIS domains are defined so as not to include upstream and/or downstream channels from different line cards is that, typically, each line card includes a single MAC controller for scheduling timeslot allocations for the upstream channels associated with that line card. Moreover, it is typically the case in conventional DOCSIS implementations that the different MAC controllers residing on the different line cards are not synchronized with each other. As a result, upstream/downstream channels from different line cards are typically not grouped together in a DOCSIS domain since the upstream/downstream channels from different line cards will not be synchronized with each other. These issues are described in greater detail with respect to FIG. 2 of the drawings.

FIG. 2 shows a block diagram of a conventional configuration for an HFC network. As shown in FIG. 2, the CMTS 210 may include a plurality of physically distinct line cards, e.g. Line Card A 203 and Line Card B 204. Each line card provides a separate interface for communicating with a specific group of cable modems in the network. For example, Line Card A 203 includes a distinct group of ports (e.g., 205, 212) for communicating with cable modem Group A 260a, and Line Card B includes a separate distinct group of ports (e.g., 225, 233) for communicating with cable modem Group B 260b.

Each line card within CMTS 210 includes a separate MAC controller for controlling the group of ports which reside on that physical line card. For example, on Line Card A, MAC controller 206 controls downstream transmitter 212 and the plurality of upstream receivers 205. Similarly, the MAC controller 208 on Line Card B controls downstream transmitter 233 and the plurality of upstream receivers 225.

According to conventional techniques, each MAC controller includes its own unique timestamp counter for generating a local time reference specific to the particular line card on which it resides. Thus, for example, MAC controller 206 includes a first timestamp counter (not shown) which generates a local time reference to be used by Line Card A for communicating with the plurality of Group A cable modems. Likewise, MAC controller 208 includes its own timestamp counter (not shown) for generating a local time reference to be used by Line Card B for communicating with the Group B cable modems. Typically, in conventional CMTS systems, the timestamp counters which reside on different line cards are not synchronized.

Because data-over-cable service is a relatively new and emerging technology, conventional cable networks have been designed to be efficient in handling burst data transmissions from the plurality of network cable modems to the CMTS. Additionally, conventional cable network configurations are designed to take into account the asymmetrical bandwidth allocation on the upstream and downstream channels. For example, a downstream channel will typically have a bandwidth of 30-50 Mbps, and an upstream channel will typically have a bandwidth of 1-10 Mbps. In taking the above factors into account, it is common practice to statically configure each line card to include a single downstream channel transmitter and a predetermined number of upstream channel receivers.

As commonly known to one having ordinary skill in the art, the addressing scheme which is implemented in conventional HFC networks is unique for each DOCSIS domain. That is to say, each DOCSIS domain includes a predetermined range of Service Identifier addresses or SIDs which are unique to that particular domain. According to the DOCSIS specification, SIDs are used to identify flows associated with particular cable modem in a particular DOCSIS domain. SIDs are also used by the CMTS to schedule upstream channel timeslot allocations for particular cable modems. Each SID is typically configured as a 14-bit binary number. Each cable modem typically has a primary SID and may also have one or more multiple secondary SIDs assigned to it for handling different types of service flows (e.g. data, VoIP, Video, etc).

Conventional DOCSIS addressing techniques typically allocate about 8000 SIDs for each DOCSIS domain. Moreover, each DOCSIS domain is limited to a fixed size due to the physical constraints described above. Consequently, the conventional DOCSIS protocol is not designed to take advantage of new and emerging broadband network applications such as video-on-demand, telephony, etc. Accordingly, there exists a continual need to improve access network configurations in order to accommodate new and emerging network applications and technologies.

SUMMARY OF THE INVENTION

According to a specific embodiments, the technique of the present invention provides an improved addressing scheme for use in access networks, wherein upstream and/or downstream channels may be grouped together based upon logical associations rather than physical associations. Further, according to at least one embodiment of the present invention, various techniques are described for routing selected channel MAP messages to appropriate channels and/or cable modems within a cable network.

Alternate embodiments of the present invention are directed to methods, computer program products, and systems for defining service flow identifiers in an access network. Each service flow identifier may be used for identifying a particular service flow associated with a specific node in the access network. The access network may include at least one upstream channel and at least one downstream channel for communicating with a selected portion of the nodes. The access network may further include a Head End Complex, the Head End Complex including at least one interface for accessing the upstream and downstream channels. A plurality of service flow identifier groups may be defined at a network device, such as, for example, the CMTS of a cable network. Each service flow identifier group may include a plurality of different service flow identifiers. Each service flow identifier group is associated with a different upstream channel in the access network. According to specific embodiments, each service flow identifier group may be defined independently from any defined domain of upstream and/or downstream channels.

Other embodiments of the present invention are directed to methods, computer program products, and systems for defining service flow identifiers in an access network. Each service flow identifier may be used for identifying a particular service flow associated with a specific node in the access network. The access network may include at least one upstream channel and at least one downstream channel for communicating with a selected portion of the nodes. The access network may further include a Head End Complex, the Head End Complex including at least one interface for accessing the upstream and downstream channels. A first service flow identifier associated with a first network node is identified. The first node is configured to communicate with the Head End Complex via a first upstream channel. A modified service flow identifier associated with the first service flow identifier is generated. According to a specific embodiment, the modified service flow identifier includes additional information relating to an identity of the first upstream channel. According to specific embodiments, the modified service flow identifier includes a first portion of bits which are identical to the bits corresponding to the first service flow identifier, and further includes a second portion of bits, not included in the first service flow identifier, which may be used for identifying the first upstream channel Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 4A-D illustrate different embodiments for implementing a SID addressing scheme of the present invention, wherein each SID is uniquely defined per upstream channel.

FIGS. 5A-C illustrate different embodiments for implementing downstream channel addressing in accordance with the technique of the present invention.

FIG. 6B shows a specific embodiment of a Membership Table 620 which may be used for implementing the map routing technique of the present invention.

FIG. 6C shows a specific embodiment of an Activity Table 650 which may be used for implementing the map routing technique of the present invention.

DETAILED DESCRIPTION OF THE PREFERRED EMBODIMENTS

Figure 1:
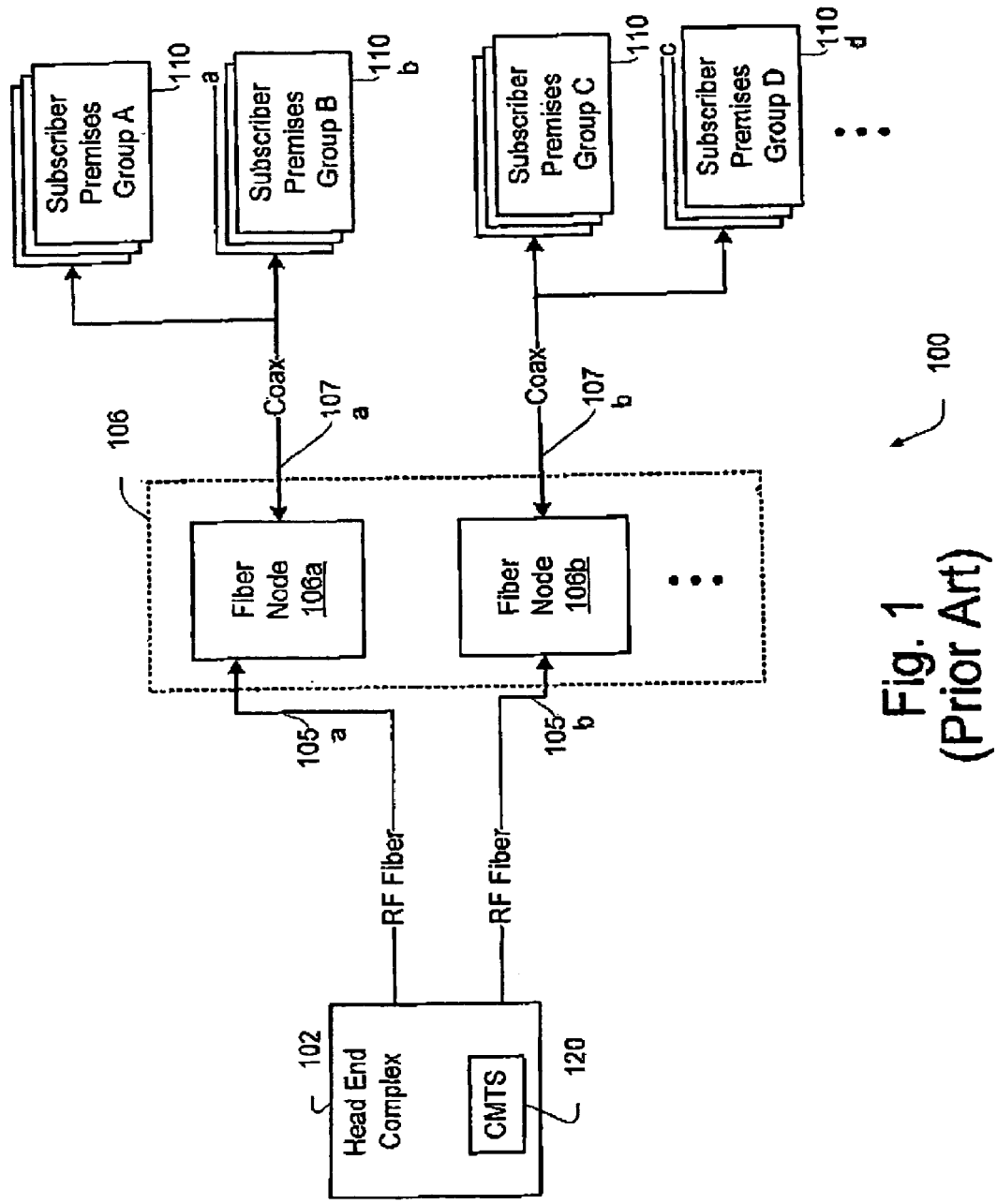
FIG. 1 shows a specific embodiment of a cable network which may be used with the technique of the present invention.
Figure 2:
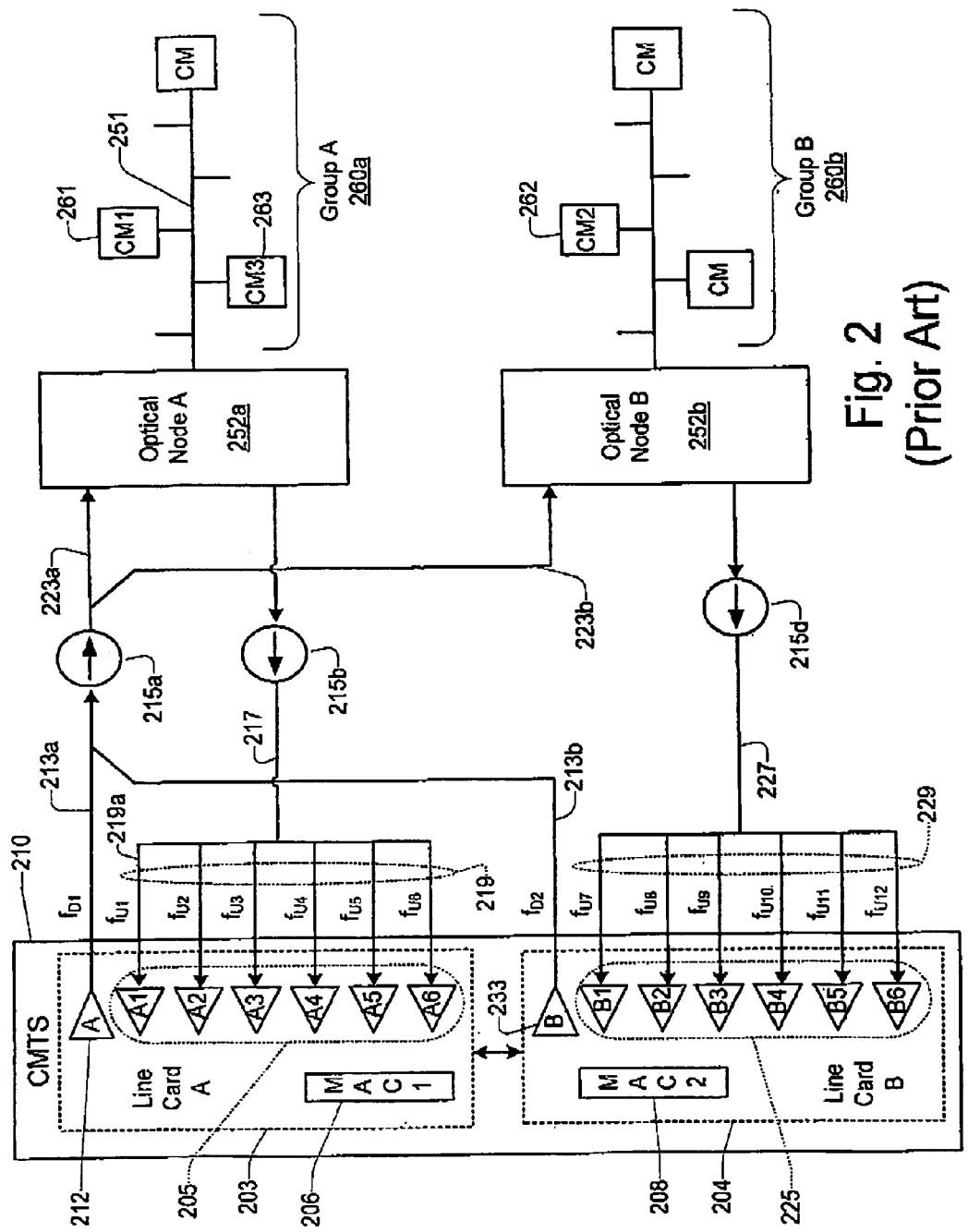
FIG. 2 shows a block diagram of a conventional implementation of a cable network 200.

According to a specific embodiments, the technique of the present invention provides an improved addressing scheme for use in access networks, wherein upstream and/or downstream channels may be grouped together based upon logical associations rather than physical associations. Thus, unlike conventional techniques where the upstream and downstream channels of conventional HFC networks are grouped together based upon their physical associations, the technique of the present invention enables DOCSIS domains to be defined based upon a logical association between upstream and/or downstream channels. Further, according to at least one embodiment of the present invention, various techniques are described for routing selected channel MAP messages to appropriate channels and/or cable modems within a cable network.

According to a specific embodiment of the present invention, a new addressing scheme may be implemented in access networks wherein SID addresses may be uniquely defined per upstream channel rather than per DOCSIS domain. For example, conventional techniques typically allocate about 8000 SIDs for each DOCSIS domain. Thus, only 8000 SIDs are available to be assigned to cable modems using the grouping of upstream and/or downstream channels associated with that particular domain. In contrast, using the technique of the present invention, each upstream channel of a particular DOCSIS domain may be allocated 8000 SIDs. Thus, it will be appreciated, that the technique of the present invention represents a departure from the standard DOCSIS protocol in that the technique of the present invention, according to one implementation, provides that SID addressing be assigned per upstream channel rather than per DOCSIS domain.

FIGS. 4A-D illustrate different embodiments for implementing a SID addressing scheme of the present invention, wherein each SID may be uniquely defined per upstream channel.

As shown in the embodiment of FIG. 4A, each global SID 400 (herein referred to as "global SID") may be defined as being associated with a respective slot in the CMTS (e.g. which is occupied by a specific line card), and a respective port on the line card corresponding to that particular slot. Thus, according to the example of FIG. 4A, a new global SID 400 may be defined using a k-bit binary integer. The integer may include a first portion of j bits 406 (corresponding to a conventional DOCSIS SID, herein referred to as a "conventional SID"), a second portion of n bits 404 representing a slot number of an associated upstream channel, and a third portion of n bits 402 representing a port number of the associated upstream channel. According to a specific implementation, the slot number, port number, and conventional SID values may be derived, for example, from routing table information typically stored at the CMTS. According to one implementation, the global SID 400 may be represented as a 32-bit integer, wherein 16 bits may be used to represents the conventional DOCSIS SID portion 406, 8 bits are used to specify the Port ID 404, and a different 8 bits may be used to specify the Slot ID 402.

The conventional SID portion 406 of the global SID 400 may be used for communicating with cable modems which are configured to operate according to the standardized DOCSIS protocol, whereas the global SID 400 may be used locally at the CMTS, for example, by the software residing at the CMTS. According to the DOCSIS specification, a DOCSIS compliant SID is characterized by a 14-bit binary number. The most significant bit of the DOCSIS SID is used to differentiate between unicast addressing and multicast addressing.

According to a specific embodiment, the global SID may be generated by using, for example, routing information (e.g. slot number, port number) used for communicating with the cable modem. In a specific implementation, the global SID value may be dynamically generated at the CMTS when communicating with a particular cable modem. Alternatively, the global SID of the present invention may be retrieved from a Global SID Table residing within the CMTS. According to a specific embodiment, the hardware and/or software at the CMTS may be configured to automatically prepend the slot number and port number to the conventional SID ID associated with a particular cable modem to thereby generate the global SID associated with that cable modem. Additionally, according to a specific implementation, separate instances of SID Tables may be maintained for each upstream channel. In contrast, conventional DOCSIS techniques typically provide only one instance of a SID table to be maintained for multiple upstream channels (rather than for each upstream channel).

It will be appreciated that, using the SID addressing scheme as shown, for example, in FIG. 4A of the drawings, a plurality of unique SID pools may be defined for each upstream channel in the network. This is shown, for example, in FIG. 4B of the drawings. FIG. 4B shows a SID Pool Table 450, illustrating how each upstream channel (e.g. US1, US2, US3, etc.) has assigned to it its own unique SID pool. For example, upstream channel US1 has been assigned a unique SID pool ranging from (slot 1, port 1, 0) to (slot 1, port 1, 7999), and upstream channel US2 has been assigned a unique SD pool ranging from (slot 1, port 2, 0) to (slot 1, port 2, 7999).

It will be appreciated that the addressing scheme of the present invention may be modified by one having ordinary skill in the art in order to provide desired characteristics or capabilities. For example, the global SID 400 of FIG. 4 may be represented as an integer value which has any desired number of bits, with the minimum bit length conforming with the minimum bit length as defined in the DOCSIS specification. Additionally, other addressing schemes may be used for identifying the particular upstream channel associated with the particular SID. For example, a logical identifier may be used (where provided) at the CMTS to identify a specific port and/or slot number. Examples of this latter addressing scheme to our shown, for example, in FIGS. 4C-D of the drawings.

FIG. 4C shows an alternate embodiment of the SID addressing technique of the present invention. According to the example of FIG. 4C, a global SID 430 may be defined using a k-bit binary integer. The integer may include a first portion of j bits 436 (representing the traditional DOCSIS SID), and a second portion of m bits 434 representing an upstream channel ID or other descriptor. According to one implementation, the global SID 430 may be represented as a 24-bit integer, wherein 16 bits may be used to represents the conventional DOCSIS SID portion 436, and 8 bits may be used to represent the upstream channel ID portion 434.

FIG. 4D shows an alternate embodiment of the SID addressing technique of the present invention. According to the example of FIG. 4C, a global SID 470 may be defined using a k-bit binary integer. The integer may include a first portion of j bits 476 (representing the conventional DOCSIS SID), a second portion of m bits 474 representing an upstream channel ID or other descriptor, and a third portion of n bits 472 representing a domain ID associated with the upstream channel. According to one implementation, the domain ID portion 472 may be represented by 8 bits. The embodiment of FIG. 4D may be used, for example, in cable networks which have more than 256 upstream channels.

It will be appreciated that different types of SID addressing schemes may be used simultaneously by different processes at the CMTS. For example, it may be more convenient for a downstream packet forwarding engine residing at the CMTS to utilize a SID addressing scheme as defined in FIG. 4A of the drawings, whereas the SID addressing scheme illustrated in FIG. 4C may be more suitable for use by a load balancing process residing at the CMTS.

According to at least one embodiment of the present invention, the different addressing techniques used for assigning unique service identifiers for each upstream channel may be used interchangeably, depending upon convenience of use and/or other desired characteristics. In such embodiments, a translation mechanism may be implemented for translating from one type of addressing scheme to another type. For example, in implementations where different types of SID addressing schemes are used simultaneously by different processes at the CMTS, a conversion table may be used for performing conversions between the different types of SID addresses which are used. For example, a translation mechanism may be implemented at the CMTS whereby a slot number and port number may be determined from an upstream channel ID or a DOCSIS ID in combination with an upstream channel ID or vice versa.

It will be appreciated that the addressing technique of the present invention provides a mechanism where SID addresses may be uniquely defined per upstream channel rather than per DOCSIS domain. Thus, according to specific embodiments, it is possible for the conventional SID portion of two or more global SIDs within a DOCSIS domain to be identical. Such a situation may result in improper encryption/decryption operations since many DOCSIS security protocol implementations use the conventional SID value associated with a particular packet (typically referred to as a Security Association Identifier or SAID, which is included in the packet header) to identify a proper encryption/decryption key for that packet. An example of a conventional DOCSIS security protocol is described in the reference document, Baseline Privacy Plus Interface Specification, SP-BPI+-I06-001215, Dec. 15, 2000, published by Cable Television Laboratories, Inc., of Louisville, Colo., incorporated herein by reference in its entirety for all purposes.

According to specific embodiments of the present invention, such improper encryption/decryption operations may be avoided by using a different identifier (other than the SAID value) associated with a particular packet to identify a proper encryption/decryption key for that packet. For example, according to one embodiment, a security pointer may be appended or prepended to a packet which may then be used to identify a proper encryption/decryption key associated with that packet. In one implementation, the security pointer may be included in the non-payload portion (e.g. control portion) of the packet, and used by the CMTS to perform an encryption/decryption key lookup in an encryption key table. In one embodiment, the security pointers may be defined to be unique per fiber node group.

As stated previously, one aspect of the present invention provides for a new addressing and/or domain assignment technique wherein upstream and/or downstream channels may be selectively grouped together based upon logical associations. In order for a particular upstream or downstream channel to be arbitrarily assigned to a specific grouping or domain, each upstream and downstream channel in the network should preferably have a unique address or identifier which may be used for uniquely identifying that particular channel. As shown, for example, in FIGS. 4A-D, each upstream channel in the network may be uniquely identified, for example, based upon its associated slot number and port number, its upstream channel descriptor, and/or its upstream channel descriptor in combination with its associated domain ID.

As with the upstream channels, each downstream channel should preferably have a unique address or identifier. Examples of such addresses and/or identifiers are shown in FIGS. 5A-C of the drawings.

FIGS. 5A-C illustrate different embodiments for implementing downstream channel addressing in accordance with the technique of the present invention. For example, as shown in FIG. 5A, a downstream channel may be uniquely defined by its associated slot number 502 and its associated port number 505. Alternatively, as shown in FIG. 5B, a downstream channel may be uniquely identified by a downstream channel ID or other descriptor 535. Alternatively, as shown, for example, in FIG. 5C, a downstream channel may be uniquely identified using a downstream channel descriptor 575 in combination with the domain ID 572 associated with that particular downstream channel.

It will be appreciated that the addressing scheme of the present invention allows the arbitrary assignment of upstream and/or downstream channels for each domain. Moreover, each downstream and upstream channel may be uniquely defined per CMTS chassis or CMTS system. In contrast, in conventional cable network implementations, upstream and downstream identifiers are typically defined to be unique per DOCSIS domain, and are typically not defined to be unique per CMTS chassis or CMTS system.

Each DOCSIS domain typically includes a plurality of other addressing entities such as, for example, service flow ID, classifier ID, etc. According to a specific embodiment, these other addressing entities may be represented as 32-bit integers, and may be logically assigned, and are generally used for setting up connections and/or keeping track of communications between cable modems and the CMTS. According to a specific embodiment of the present invention, these other DOCSIS addressing schemes (e.g. service flow ID, classifier ID, etc.) may be allocated per CMTS chassis, rather than per DOCSIS domain. According to a specific embodiment, a CMTS chassis may include multiple DOCSIS domains.

One advantage of the technique of the present invention is that it enables a DOCSIS domain to be defined logically, wherein a single DOCSIS domain may include multiple upstream and/or downstream channels from different line cards. Additionally, it will be appreciated that, according to at least one implementation, the different line cards within the CMTS of the system of the present invention are each synchronized with each other using one of the synchronization techniques described, for example, U.S. patent application Ser. No. 09/490,761. For example, as described in that application, all time stamps associated with a CMTS chassis may be synchronized across all the downstream channels connected to the CMTS.

Figure 3:
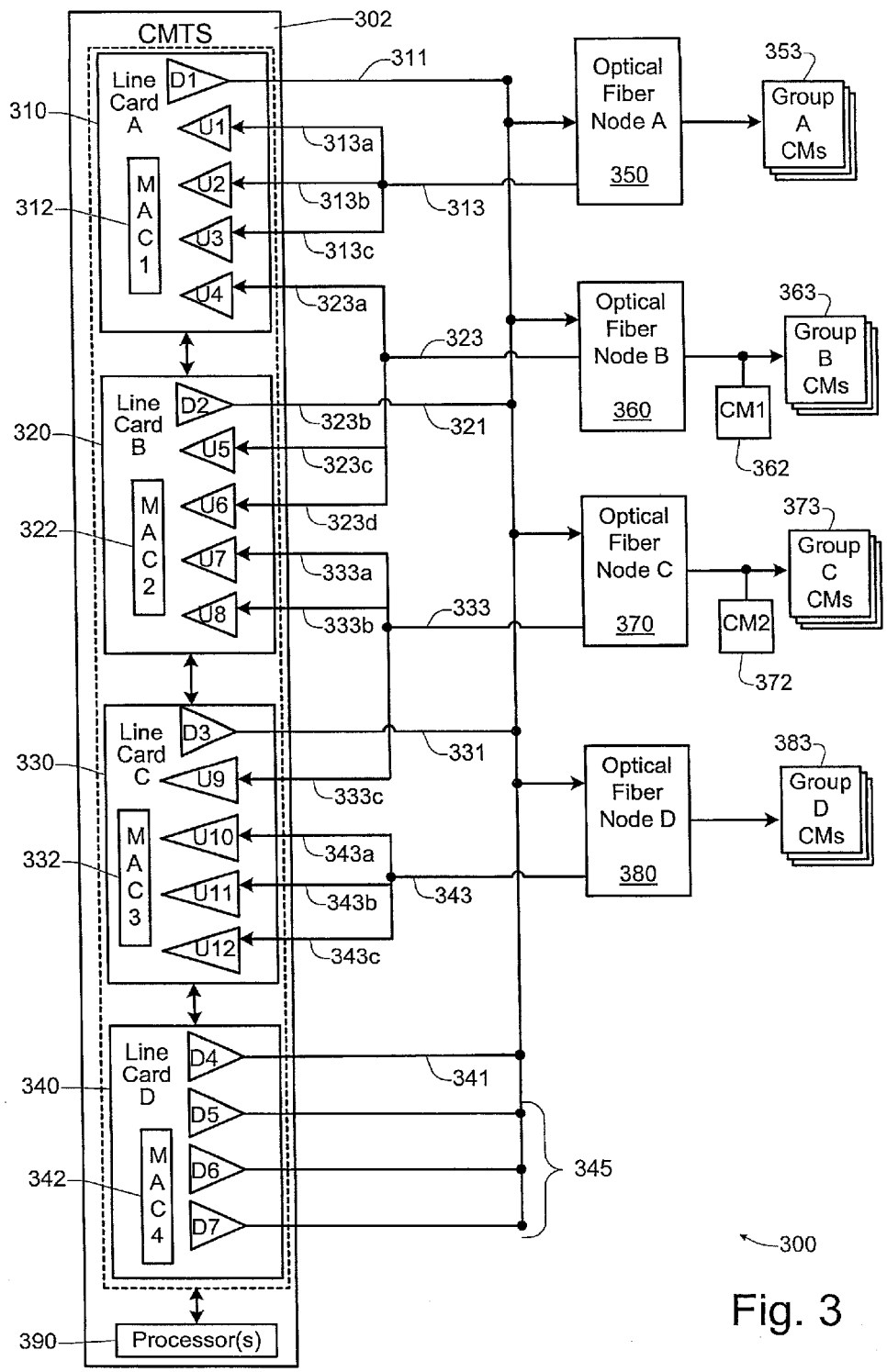
FIG. 3 shows a block diagram of a specific embodiment of a portion of a cable network 300 which may be used for implementing the technique of the present invention.

An additional advantage of the present invention is that each fiber node may be serviced by multiple line cards as shown, for example, in FIG. 3 of the drawings. Since DOCSIS domains may now be logically defined, each DOCSIS domain may include selected upstream and/or downstream channels from different line cards.

FIG. 3 shows a block diagram of a specific embodiment of a portion of a cable network 300 which may be used for implementing the technique of the present invention. As shown in FIG. 3, the CMTS 302 may include a plurality of different line cards (e.g. 310, 320, 330, 340, etc.). Each line card may include one or more upstream and/or downstream channel ports.

As shown in the specific configuration of FIG. 3, optical Fiber Node A 350 is configured to receive downstream channels D1-D7, and is further configured to communicate with the CMTS 302 via upstream channels U1-U3. Thus, it will be appreciated that any of the cable modems of Group A 353 is able to receive communications from the CMTS via any one of the downstream channels D1-D7, and is further able to transmit information to the CMTS via any of the upstream channels U1-U3.

Optical Fiber Node B 360 is also configured to receive downstream channels D1-D7, and is further configured to communicate with the CMTS via upstream channels U4-U6. Thus, it will be appreciated that any of the cable modems of Group B 363 is able to receive communications from the CMTS via any one of the downstream channels D1-D7, and is further able to transmit information to the CMTS via any of the upstream channels U4-U6.

The cable modems of Group C 373 which are connected to optical fiber node C 370 are able to receive downstream transmissions from the CMTS via downstream channels D1-D7, and are able to transmit information upstream to the CMTS via upstream channels U7-U9.

The cable modems of Group D 383 which are connected to optical fiber node D 380 are able to receive downstream transmissions from the CMTS via downstream channels D1-D7, and are able to transmit information upstream to the CMTS via upstream channels U10-U12.

Using one of the addressing schemes of the present invention as described, for example, in FIGS. 4A-4D and 5A-5C, any desired combination of upstream and/or downstream channels across different line cards may be logically grouped together to form different logical domains for servicing each of the plurality of fiber nodes.

According to a specific embodiment, one difference of how the technique of the present invention differs from conventional techniques relates to the process of how cable modems change upstream channels within a particular DOCSIS domain. According to a specific embodiment of the present invention, if a cable modem changes upstream channels within the same DOCSIS domain, that cable modem may need to acquire a new SID, since the SIDs are uniquely assigned per upstream channel rather than per DOCSIS domain.

U.S. patent application Ser. No. 09/606,503 describes a technique for implementing dynamic downstream and/or upstream channel changes for selected nodes in an HFC or other access network. According to a specific embodiment, the technique of present invention may utilize the dynamic channel change technique described In U.S. patent application Ser. No. 09/606,503. Additionally, it will be appreciated that the synchronization technology described in U.S. patent application Ser. No. 09/490,761 may be used in conjunction with the dynamic channel change technology described in U.S. patent application Ser. No. 09/606,503 to allow the CMTS to be able perform traffic load balancing in access networks such as, for example, the HFC network of FIG. 3.

It will be appreciated that the CMTS domain assignment technique of the present invention provides a number of advantages over conventional techniques. For example, any combination of upstreams and/or downstreams may be created to form a particular domain or sub-domain, even across a plurality of different line cards. Additionally, the SID addressing space available for each domain or sub-domain may be significantly increased. For example, conventional addressing techniques provide for up to 8000 SIDs for each domain, whereas the addressing scheme of the present invention provides for up to 8000 SIDs per upstream channel. Thus, the technique of the present invention accommodates a high number of low bandwidth devices, and also accommodates multiple SID assignments for a single node or cable modem. In addition, the technique of the present invention allows for the development of upstream and/or downstream only cards which, for example, may be useful for video-on-demand applications or video over IP applications.

According to a specific implementation, multiple SIDs may be assigned to a given cable modem in order to allow different services or flows to be conducted with that particular cable modem. For example, one SID may relate to data services, another SID may be related to voice services from that cable modem and yet another SID may be related to music files (e.g. MP3 files) being communicated to and from the cable modem. Thus, SIDs may be used to discriminate between services. Multiple SIDs may be used to schedule different types of traffic emanating from a particular cable modem.

Because the addressing scheme of the present invention assigns SID addresses per upstream channel, each node (e.g. cable modem) in the HFC network has associated with it a unique SID value which may be independent from the domain in which that cable modem is a member. For example, using the SID embodiment of the present invention, each cable modem in the HFC network may have assigned to it a unique global SID, with no overlap between different DOCSIS domains. This addressing scheme, in turn, provides an advantage of allowing extremely flexible domain assignments within the CMTS, which may be logically based.

For example, in one implementation, a separate DOCSIS domain (or CMTS domain) may be assigned to one or more selected fiber nodes within the HFC network. Alternatively, a single DOCSIS domain may be allocated to the entire CMTS chassis, which may be connected to one or more fiber nodes.

Another advantage of the addressing scheme of the present invention is that it allows for a single fiber node group to be serviced by multiple line cards within the CMTS. It will be appreciated that such a configuration would be incompatible with most conventional HFC networks configured to implement the DOCSIS standard. More specifically, a preferred embodiment of conventional HFC networks is to connect one or more fiber nodes to a single line card. An example of such a configuration is shown in FIG. 3 of the drawings.

Additionally, it will be appreciated that the technique of the present invention is particularly well suited for implementing video over IP using HFC networks or other networks which are configured to utilized the DOCSIS protocol.

Routing of Channel MAP Messages

As described previously, the technique of the present invention differs from conventional HFC systems, according to specific implementations, in that downstream channels used for servicing a particular fiber node group may be selected independently from the upstream channels which are used for servicing that same fiber node group. According to the DOCSIS specification, MAP messages are generated at the CMTS for each respective upstream channel in order to inform the cable modems using each upstream channel of the various timeslot allocations for that channel. However, according to at least one embodiment of the present invention, a plurality of downstream channels associated with different line cards within the CMTS may be used to communicate with a plurality of cable modems serviced by a particular fiber node. This is shown, for example, by way of illustration with reference to FIG. 3.

Referring to the example of FIG. 3, it is assumed that the plurality of cable modems 353 which are serviced by Fiber Node A 350 communicate with the CMTS via two downstream channels (namely downstream channel D1 311 and downstream channel D4 341) and three upstream channels (namely upstream channels U1-U3 313*a-c*). Further, it is assumed that each of the plurality of cable modems 353 are capable of accessing any of the downstream channels D1, D4, and any of the upstream channels U1-U3.

Since a first portion of the cable modems 353 are receiving information from the CMTS via downstream channel D1, and a second portion of cable modems 353 are receiving information from the CMTS via downstream channel D4, each of the respective MAP messages for upstream channels U1-U3 may need be broadcast to the cable modems 352 via both downstream channel D1 and D4.

One technique for providing the appropriate MAP messages to each of the plurality of cable modems 353 (herein referred to as the "brute force technique") is to broadcast each of the respective MAP messages (for upstream channels U1, U2, and U3) on each of the downstream channels D1 and D4. Thus, in this first example, three periodically generated MAP messages (corresponding to upstream channels U1, U2, and U3, respectively) may be broadcast to the first portion of cable modems using downstream channel D1, and the same three MAP messages may also be broadcast to the second portion of cable modems using downstream channel D4, resulting in a total of six MAP messages being transmitted by the CMTS to the Group A cable modems 353.

One problem with the above-described "brute force" MAP transmission technique is that it results in an inefficient utilization of resources since, typically, each cable modem will be communicating with the CMTS via a single upstream channel and a single downstream channel and therefore need not receive MAP messages for each upstream channel in the sub-domain.

Accordingly, an alternate technique for transmitting MAP messages to the appropriate cable modems is to route the appropriate MAP message to the appropriate downstream channels which are used by cable modems that have been identified for receiving the MAP messages. An example of this latter technique is described below, with respect to FIGS. 6A-C of the drawings.

Figure 6A:
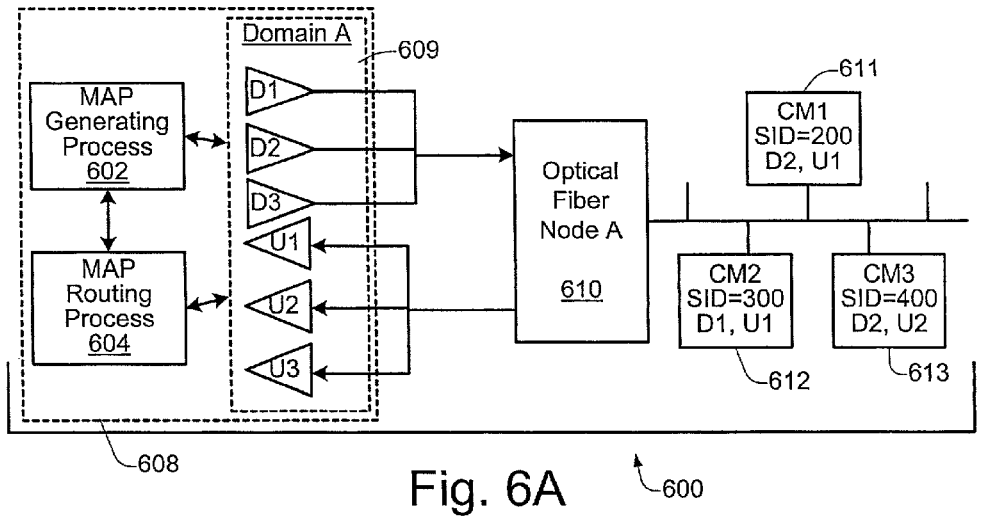
FIG. 6A shows an example of a cable network 600 which may be used for implementing the map routing technique of the present invention.

FIG. 6A shows an example of a cable network 600 which may be used for implementing the map routing technique of the present invention. It will be appreciated that the cable network 600 represents a simplified version of an HFC network, which may be used for purposes of illustrating how a specific embodiment of the map routing technique of the present invention may be implemented. As shown in FIG. 6A, a plurality of cable modems, namely CM1 611, CM2 612, and CM3 613, communicate with the Head End Complex 608 via three downstream channels D1-D3, and three upstream channels U1-U3, which have been grouped together to form Domain A 609. According to a specific implementation, the respective ports associated with the various upstream and downstream channels of Domain A may be located on different line cards within the CMTS. In the present example, it may be assumed that downstream channels D1-D3 correspond to ports numbers 1-3 on a first line card residing in Slot 1, and that upstream channels U1-U3 correspond to port numbers 1-3, respectively, on a second line card residing in Slot 2. Additionally, as shown in FIG. 6A, each cable modem CM1-CM3 has been assigned a unique SID, and is currently using the particular upstream channel and a particular downstream channel for communicating with the Head End Complex 608. More specifically, as illustrated in FIG. 6A, cable modem CM1 has been assigned a SID value of 200, is configured to listen to the CMTS on downstream channel D2, and is configured to talk to the CMTS using upstream channel U1. Cable modem CM2 has been assigned a SID value of 300, is configured to listen to the CMTS on downstream channel D1, and is configured to talk to the CMTS using upstream channel U1. Cable modem CM3 has been assigned a SID value of 400, is configured to listen to the CMTS on downstream channel D2, and is configured to talk to the CMTS using upstream channel U2.

According to a specific embodiment, timeslot allocation MAP messages may be routed to selected cable modems, depending upon each cable modem's connectivity parameters. More specifically, according to a specific implementation, the MAP routing technique of the present invention may be used to route particular MAP messages to the appropriate downstream channel(s) which are used by cable modems that have been identified as needing to receive the particular MAP messages.

For example, referring to FIG. 6A, the Head End Complex may determine that cable modems CM1 and CM2 are utilizing upstream channel U1 for communicating with the Head End Complex, and therefore will transmit MAP messages for upstream channel U1 to cable modems CM1 and CM2 via downstream channels D2 and D1, respectively. Additionally, the Head End Complex may determine that cable modem CM3 is utilizing upstream channel U2 for communicating with the Head End Complex, and therefore will transmit MAP messages for upstream channel U2 to cable modem CM3 via downstream channel D2. However, since there are no cable modems listening on downstream channel D1 which need to receive MAP messages for upstream channel U2, the CMTS does not need to broadcast MAP messages for upstream channel U2 on the downstream channel D1.

A specific embodiment which may be used for implementing the map routing technique of the present invention is shown, for example, in FIGS. 6B and 6C of the drawings.

FIG. 6B shows a specific embodiment of a Membership Table 620 which may be used for implementing the map routing technique of the present invention. According to a specific embodiment, the Membership Table 620 may be used by the CMTS to keep track of the upstream and downstream channels which are used by selected cable modems (or specific flows associated with selected cable modems) to communicate with the CMTS. In the example of FIG. 6B, the Membership Table 620 may be used to identify the SID, upstream channel, and downstream channel assignments for cable modems CM1-CM3 of FIG. 6A. Each entry in the Membership Table 620 may include, for example, a SID identification field 622, an upstream channel ID field 624, and a downstream channel ID field 626. According to a specific embodiment, the SID identification field 622 may include an identifier or value which may be used for identifying a particular cable modem, SID (associated with a particular cable modem), or service flow (associated with a particular cable modem). In one implementation, the SID identification field 622 may correspond to an global SID value as described, for example, in FIGS. 4A-4D of the drawings. The upstream channel identifier field 624 may include a descriptor or value for identifying the upstream channel associated with that particular SID, and the downstream channel identifier field 626 may include a descriptor or value for identifying the downstream channel associated with that particular SID.

In the specific embodiment of FIG. 6B, entry 621 of the Membership Table 620 corresponds to cable modem CM1, and includes an global SID value defined in accordance with the embodiment of FIG. 4A (e.g. upstream channel slot number=2, upstream channel port number=1, conventional SID=200). The upstream channel currently used by cable modem CM1 is upstream channel U1, which may be identified in field 624 of entry 621 of the Membership Table 620. It will be appreciated that a variety of different upstream channel identifiers or descriptors may be used for identifying the upstream channel associated with a particular SID. For example, the upstream channel identifier of Membership Table 620 may include a conventional DOCSIS upstream channel ID. Alternatively, the upstream channel identifier may include the slot number and port number associated with that particular upstream channel, or may include the domain ID and upstream channel ID associated with the particular upstream channel, as described, for example, with respect to FIG. 4D of the drawings.

The downstream channel associated with cable modem CM1 is identified in the Membership Table 620 as downstream channel D2. It will be appreciated that a variety of different techniques may be used for referencing or identifying a particular downstream channel in both the Membership Table 620 and the Activity Table 650 of FIG. 6C. A number of different techniques which may be used for referencing or identifying a particular downstream channel are described previously with respect to FIGS. 5A-C of the drawings.

FIG. 6C shows a specific embodiment of an Activity Table 650 which may be used for implementing the map routing technique of the present invention. Using information from the Membership Table of FIG. 6B, an Activity Table such as that shown, for example, in FIG. 6C may be populated and used for determining specific downstream channels in which selected channel MAP messages are to be broadcast. According to a specific embodiment, the Activity Table 650 may be used to keep track of selected downstream channels which are used for communicating with cable modems that have been identified as actively (and/or inactively) using a particular upstream channel. For example, referring to FIG. 6B, it can be seen that two cable modems, namely CM1 and CM2, are actively using upstream channel U1 to communicate with the CMTS. According to a specific embodiment of the map routing technique of the present invention, MAPs for upstream channel U1 will preferably be transmitted only on those downstream channels which have cable modems actively using upstream channel U1. As shown in FIG. 6B, this corresponds to downstream channels D1 and D2. Accordingly, as shown in the Activity Table of FIG. 6C, the entry 651 corresponding to upstream channel U1 may be populated to indicate that MAP messages for upstream channel U1 are to be transmitted on downstream channels D1 and D2 (which correspond to the value "A" for "Active"), but do not need to be broadcast on downstream channel D3 (which is populated with a value of "I" for "Inactive").

Each time the CMTS generates a new MAP message for a particular upstream channel, it may consult the Activity Table 650 in order to determine the appropriate downstream channels for broadcasting that particular MAP message. For example, if a MAP message for upstream channel U2 is ready to be transmitted, the CMTS may consult the Activity Table 650 in order to determine the appropriate downstream channel(s) for broadcasting the U2 MAP message. In the example of FIG. 6C, the CMTS preferably broadcasts the MAP message for upstream channel U2 only on downstream channel D2, since the only cable modems in the network of FIG. 6A which are actively using upstream channel U2 are those using downstream channel D2.

According to different embodiments, the Activity Table 650 of FIG. 6C may represent either a selected load sharing or sub-domain grouping within the cable network, or may represent only a portion of the upstream and downstream channels which are associated with a particular CMTS chassis or system. Additionally, according to a specific embodiment, population of the Membership Table 620 and the Activity Table 650 may be handled by a load sharing or load balancing process implemented at the CMTS. This aspect is described in greater detail below, with respect to FIGS. 11A and 11B of the drawings.

It will be appreciated that the MAP routing technique of the present invention may be used to significantly reduce the amount of overhead and/or system resources needed for providing MAP message information to the appropriate cable modems in the HFC network. For example, referring to the specific embodiment of FIG. 6A, if the "brute force" routing technique were used, three different upstream channel MAP messages (U1-U3) would be transmitted on each of the downstream channels D1-D3, resulting in a total of nine MAP messages being transmitted. However, using the technique of the present invention as shown, for example, in FIG. 6C, two MAP messages for upstream channel U1 would be transmitted on downstream channels D1 and D2 respectively, and a single MAP message for upstream channel U2 would be transmitted on downstream channel D2, thereby resulting in a total of 3 MAP messages being transmitted.

Figure 9:
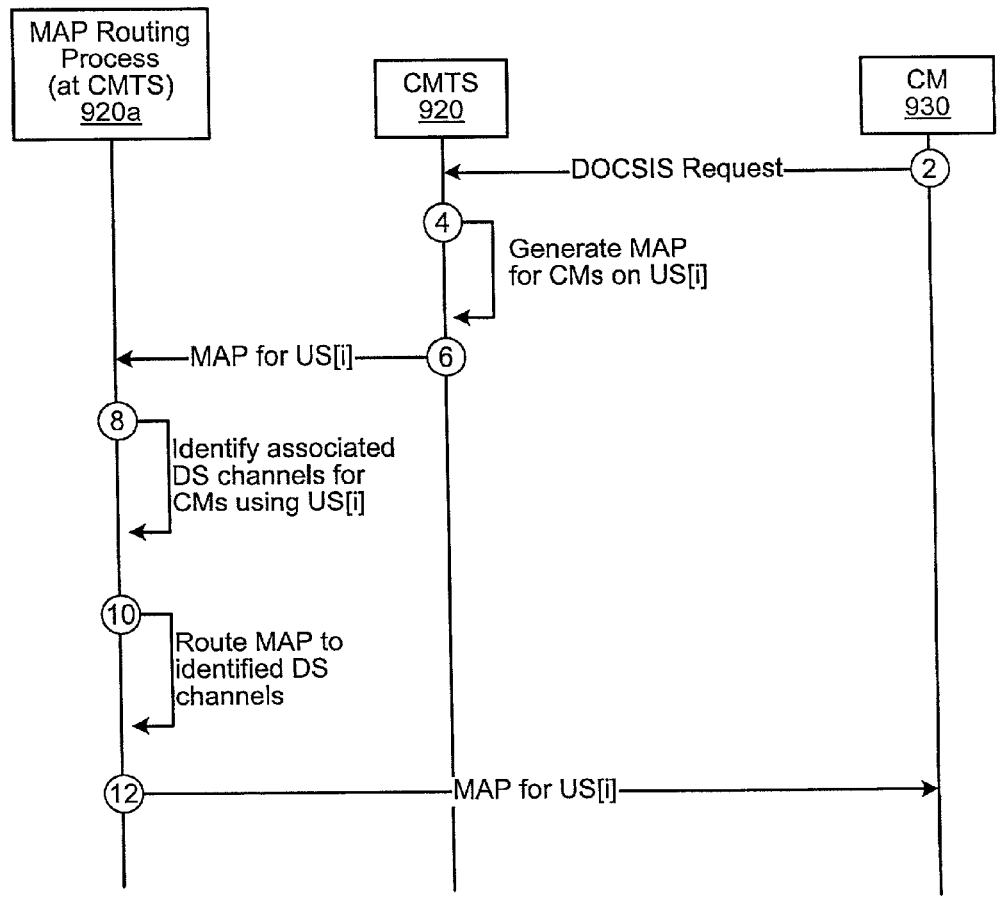
FIG. 9 shows a flow diagram of a MAP routing process in accordance with a specific embodiment of the present invention.

FIG. 9 shows a flow diagram of a MAP routing process in accordance with a specific embodiment of the present invention. For purposes of illustration, the MAP routing process of FIG. 9 will be described with respect to the cable network 600 of FIG. 6A. In this example, it is assumed that the CMTS 920 includes the appropriate hardware and/or software for generating MAP messages for all or selected upstream channels.

Initially, as shown at (2), a cable modem 920 using a particular upstream channel (herein referred to as US[i]) transmits a DOCSIS request to CMTS 920. The CMTS will provide a response to the DOCSIS request from cable modem 920 in an appropriate MAP message to be transmitted to cable modems using US[i]. At (4), the CMTS 920 generates a new MAP message for cable modems on US[i]. Once the new MAP message has been generated, it is passed (6) to the MAP routing process 920a. According to a specific embodiment, the MAP routing process resides at the CMTS. The MAP routing process then identifies (8) appropriate downstream channel(s) which are used to communicate with cable modems using US[i]. The identified downstream channels may also include other desired downstream channels, where appropriate. According to a specific embodiment, the identification of the appropriate downstream channels may be accomplished using the Activity Table 650 of FIG. 6C. Once the appropriate downstream channels have been identified, the MAP routing process replicates and routes (10) a copy of the US[i] MAP message to each of the identified downstream channels. Thereafter, the US[i] MAP message is transmitted (12) over the identified downstream channels to the appropriate cable modems, including cable modem 930.

According to a specific embodiment, routing tables for routing channel MAP messages and upstream channel descriptors (UCDs) may be maintained at the CMTS. The upstream channel descriptor (UCD) may include information relating to available upstream channels which may be used by new cable modems coming on-line. The routing tables may be used for ensuring that the MAP messages and UCDs are routed to the appropriate cable modems on the appropriate downstream channels. According to a specific implementation, the UCDs may be configured to be the same on all or selected downstream channels within a particular fiber node group or sub-domain. Such UCDs may also be routed to the appropriate cable modems using the above-described MAP routing technique. Additionally, according to one implementation, MAP messages and UCDs may be generated at a first line card and routed to appropriate other line cards for distribution to the appropriate cable modems serviced by the other line cards.

It will be appreciated that, according to a specific implementation, the scheduling and MAP/UCD functions performed at the CMTS may be implemented so as to be unique per upstream channel. This technique differs from prior art techniques, for example, in that the scheduling and MAP/UCD functions in conventional CMTS systems are configured to be unique per media access controller (MAC) chip set, and not unique per upstream channel.

Additionally, according to at least one embodiment, default channel MAP messages, which may include ranging parameters, may also be periodically generated and routed for transmission over selected downstream channels in order to allow new cable modems to join the network. This may include, for example, downstream channels D1, D2 and/or D3 of FIG. 6A.

According to a specific embodiment, specific time-aligned slots may also be scheduled across selected upstream channels in order to allow cable modems to perform specific functions. For example, according to one implementation, initial maintenance timeslots may be synchronized across all upstream channels in a particular sub-domain or fiber node group. This may be achieved, for example, by synchronizing all time stamps in a particular CMTS chassis, as described in U.S. patent application Ser. No. 09/490,761, previously incorporated by reference. According to a specific implementation, the aligning of initial maintenance timeslots in a particular sub-domain or fiber node group facilitates the initialization process of new cable modems joining the sub-domain or fiber node group. Additionally, according to a specific implementation, the synchronization or time-alignment of specific timeslots across upstream channels in a particular domain, sub-domain or fiber node group may be implemented across different line cards at the CMTS.

Load Balancing

According to a specific embodiment of the present invention, the CMTS may be configured to implement load balancing functions, whereby the upstream and/or downstream channels used by selected cable modems in a particular domain or sub-domain are assigned and possibly re-assigned by the CMTS in order to more evenly distribute the use of each upstream and/or downstream channel in the domain or sub-domain. According to a specific implementation, a sub-domain may be represented by a collection of upstream and/or channels or a collection of one or more fiber node groups. For example, in order to perform load balancing functions at the CMTS, one or more sub-domains may be defined, wherein each sub-domain includes a specific collection of upstream and/or downstream channels used for servicing particular fiber nodes. The sub-domains may be used by the CMTS to identify which collection of upstreams and/or downstreams are associated with each other in order to perform load balancing functions within that particular sub-domain. A sub-domain may also be associated with a particular fiber node group which includes one or more fiber nodes of the HFC network.

According to a specific embodiment of the present invention, groupings of upstream channels in the network may be defined separately from groupings of downstream channels in the network. Additionally, such channel groupings may be defined to cross line card boundaries. In contrast, conventional HFC systems are typically configured to include a fixed grouping of upstream and downstream channels (such as, for example, one downstream and four upstreams), which correspond to a physical configuration of the line card which is used for implementing those specific upstream and downstream channels. These features are described in greater detail with respect to FIGS. 10A-C.

Figure 10A:
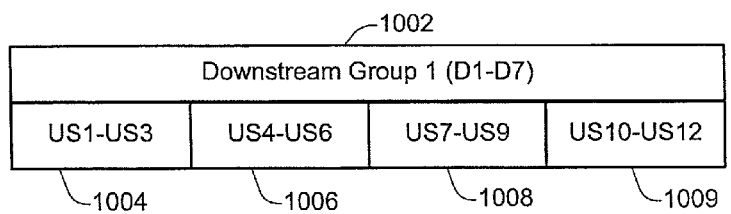
FIGS. 10A-C shows an example of different upstream and downstream load sharing groups which may be defined using the portion of a cable network 300 shown in FIG. 3.
Figure 10B:
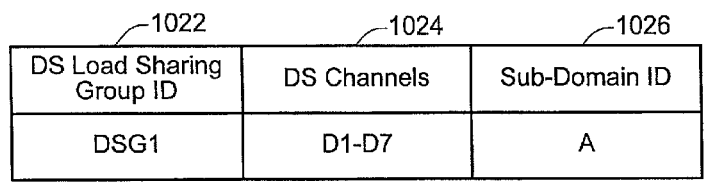
Figure 10C:
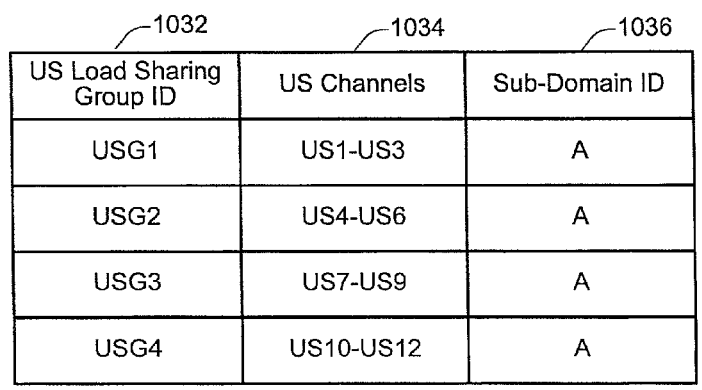

FIGS. 10A-C illustrate a specific embodiment for defining upstream and downstream load sharing groups in accordance with a specific embodiment of the present invention. FIG. 10A shows a block diagram illustrating the downstream load sharing groups and upstream load sharing groups of a portion of a cable network 300 shown in FIG. 3. According to a specific embodiment, the portion of the cable network represented by 300 of FIG. 3 may correspond to a particular sub-domain which, for purposes of this example, may be referred to as a sub-domain A. As shown in the configuration of the cable network 300, each of the downstream channels D1-D7 (spanning line cards A-D) are connected together to form a single downstream load sharing group, referred to as DSG1. This downstream load-sharing group DSG1 is represented in FIG. 10A by block 1002. It is noted that each of the optical fiber nodes 350, 360, 370, 380 of FIG. 3 is configured to receive downstream channels D1-D7 of the downstream load-sharing group DSG1.

In terms of upstream load sharing groups, it is noted that each of the optical fiber nodes in the cable network of FIG. 3 is serviced by a different group of upstream channels. For example, optical fiber node A 350 is serviced by a first group of upstream channels which include US1, US2, and US3. Optical fiber node B 360 is serviced by upstream channels US4-US6. Optical fiber node C 370 is serviced by upstream channels U7-U9, and optical fiber node D 380 is serviced by upstream channels U10-U12. According to a specific embodiment, each of these groups of upstream channel may represents a separate upstream load-sharing group, which is illustrated in FIG. 10A. Thus, as shown in FIG. 10A, the sub-domain A (corresponding to the cable network 300 of FIG. 3) may be represented by a single downstream load sharing group 1002 and a plurality of upstream load sharing groups, namely 1004, 1006, 1008, and 1009.

According to a specific embodiment, the CMTS may be configured to include data structures for storing upstream and/or downstream load sharing group information for desired portions of the cable network. Such data structures are shown, for example, in FIGS. 10B and 10C of the drawings.

FIG. 10B shows a downstream load sharing table 1020 in accordance with a specific embodiment of the present invention. According to a specific embodiment, as shown, for example, in FIG. 10B, each entry in the downstream load sharing table 1020 may include a downstream load sharing group ID field 1022, a downstream channel descriptor field 1024, a sub-domain ID field 1026, etc. According to a specific implementation, the downstream load sharing group ID field 1022 may include a descriptor or other identifier (e.g. DSG1) which may be used for identifying each particular downstream load sharing group. The downstream channel descriptor field 1024 may be used for identifying the specific downstream channels (e.g. D1-D7) associated with that particular downstream load sharing group. The sub-domain ID field 1026 may include an identifier (e.g. "A") for identifying the sub-domain associated with that particular downstream load-sharing group.

FIG. 10C illustrates an upstream load-sharing table 1030 in accordance with a specific embodiment of the present invention. According to a specific embodiment, each entry in the upstream load sharing table 1030 may include fields similar to those described with respect to the downstream load sharing table. For example, each entry in the upstream load sharing table 1030 may include an upstream load sharing group ID (e.g. USG1) which may be used for identifying a particular upstream load sharing group, an upstream channel descriptor field 1034 (e.g. US1-US3) used for describing the specific upstream channels associated with that particular load sharing group, and a sub-domain ID field 1036 (e.g. A) used for describing the sub-domain associated with that particular upstream load sharing group. According to specific embodiments, the sub-domain ID field 1036 is an optional field which may be omitted or implied. For example, in an alternate embodiment, all upstream and/or downstream load sharing groups may be assigned to a global domain. In such an embodiment, the sub-domain ID field of the load-sharing table may be omitted.

According to a specific embodiment, the information for populating the downstream and upstream load sharing tables may be stored in at least one configuration file at the Head End Complex of the cable network. When the cable network is initialized, the downstream and upstream load sharing tables may be statically configured using the information from the configuration files. The load sharing tables may also be dynamically populated by specific processes, such as, for example, initial ranging processes, load balancing processes, etc.

According to a specific implementation, load balancing may occur across selected downstream and/or upstream channels within any given domain, sub-domain, fiber node, or load balancing group. Moreover, the load balancing of the upstream and downstream channels may be independent of one another. Further, according to a specific implementation, load balancing may be implemented via static configuration, or may be implemented via dynamic configuration. For example, as described in greater detail below with respect to FIG. 1A, static load balancing may occur during cable modem registration. Additionally, as described in greater detail with respect to FIG. 1B, dynamic load balancing may be implemented, for example, when performing bandwidth allocation in response to a Dynamic Service Request from cable modems.

Figure 11A:
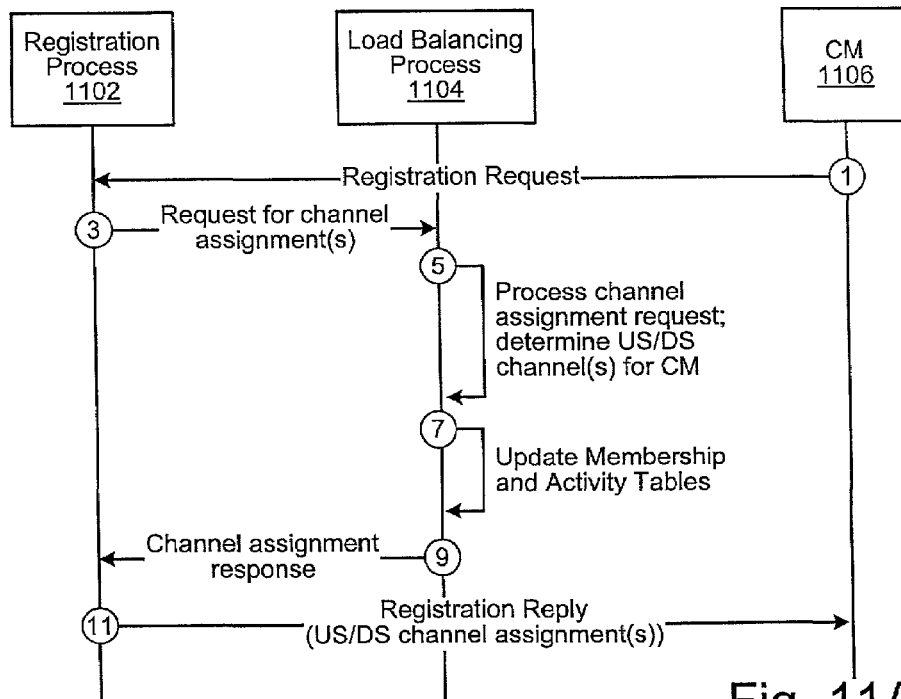
FIG. 11A illustrates a flow diagram of a Static Load Balancing Process in accordance with a specific embodiment of the present invention.

FIG. 11A illustrates a flow diagram of a Static Load Balancing Process in accordance with a specific embodiment of the present invention. According to a specific implementation, the Static Load Balancing Process of FIG. 11A may be triggered, for example, by a registration process, as explained in greater detail below. Further, according to a specific embodiment, the Static Load Balancing Process of FIG. 11A may be implemented during initialization of the cable network.

Initially, as shown at (1) of FIG. 11A, a cable modem 1106 may submit a registration request to a registration process 1102. According to a specific implementation, the registration process 1102 and load balancing process 1104 may be implemented at the CMTS. When the registration request is received at the registration process, the registration process submits (3) a request for channel assignment(s) to the load balancing process 1104. The load balancing process processes (5) the channel assignment request and determines the appropriate upstream and/or downstream channels to be assigned to the cable modem 1106. According to a specific embodiment, the assignment of the upstream/downstream channels during the registration process may be statically determined by the load balancing process 1104 by accessing pre-configured information stored at the CMTS or Head End Complex.

After the appropriate upstream and/or downstream channels have been determined for the specified cable modem, the load balancing process updates (7) the Membership and Activity Tables such as those described previously with respect to FIGS. 6B and 6C of the drawings. During this operation, the Membership and Activity Tables may be initially populated with data. Thereafter, the load balancing process transmits (9) a channel assignment response to the registration process. The channel assignment response may include, for example, a specific upstream and/or a specific downstream channel to be used by the cable modem 1106 for communicating with the CMTS. Thereafter, the registration process 1102 transmits (11) a registration reply to the cable modem 1106. The registration reply may include the specific upstream and/or downstream channel assignments to be used by the cable modem for communicating with the CMTS.

Figure 11B:
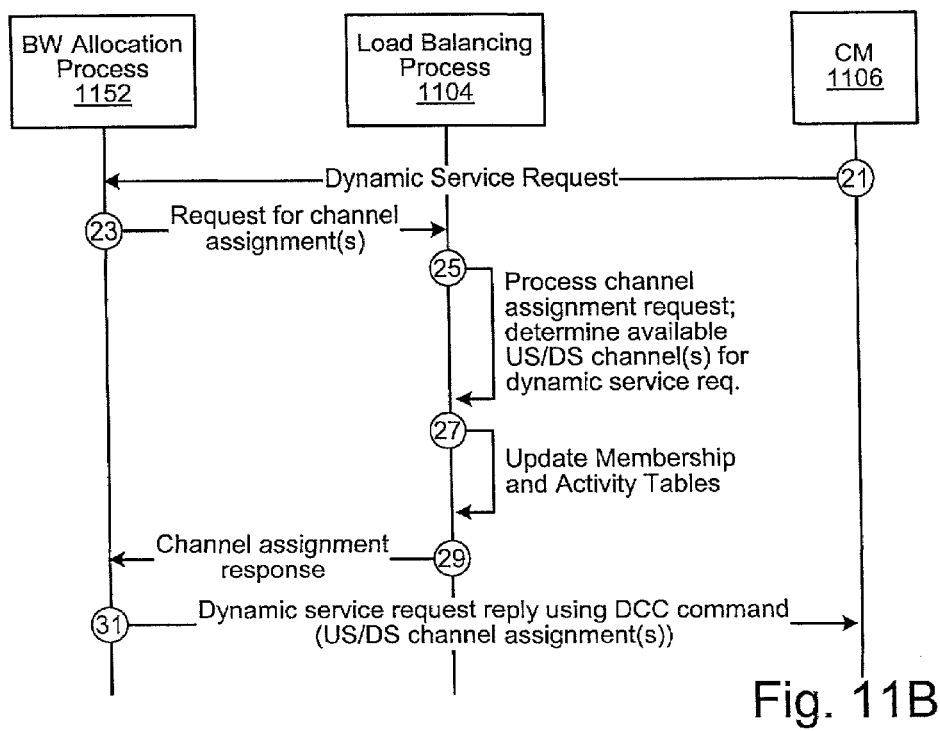
FIG. 11B shows a flow diagram illustrating a Dynamic Load Balancing Process in accordance with a specific embodiment of the present invention.

FIG. 11B shows a flow diagram illustrating a Dynamic Load Balancing Process in accordance with a specific embodiment of the present invention. According to a specific embodiment, the Dynamic Load Balancing Process of FIG. 11B may be implemented during normal operation of the cable network, after the cable network has been initialized.

According to a specific implementation, the Dynamic Load Balancing Process of FIG. 11B may be initiated in response to a dynamic service request. For example, as shown at (21) of FIG. 11B, cable modem 1106 transmits a dynamic service request to the bandwidth allocation process 1152. According to a specific embodiment, the bandwidth allocation process 1152 may be implemented at the CMTS, and may be in charge of admission control and resource assignment. An example of a dynamic service request may be a bandwidth request from the cable modem 1106 to obtain additional bandwidth for transmitting and/or receiving additional data.

Upon receiving the dynamic service request, the bandwidth allocation process 1152 transmits (23) a request for channel assignments to the load balancing process 1104. The load balancing process 1104 processes the channel assignment request, and determines (25) the appropriate upstream and/or downstream channel(s) which are available for servicing the dynamic service request. During this operation, the load balancing process may refer to the information stored in the upstream and downstream load sharing tables of FIGS. 10B and 10C.

Once the appropriate upstream and/or downstream channel(s) for servicing the dynamic service request have been determined, the Membership and Activity Tables (e.g. FIG. 6B, 6C) are updated to reflect the new channel assignments. Thereafter, the load balancing process transmits (29) a channel assignment response to the bandwidth allocation process. The channel assignment response may include the new upstream and/or downstream channel(s) which are to be used by the cable modem 1106. The bandwidth allocation process then transmits (31) a dynamic service request reply to the cable modem 1106. According to a specific embodiment, the dynamic service request reply may be implemented using, for example, a dynamic channel change command such as that described, for example, in U.S. patent application Ser. No. 09/606,530. The dynamic service request reply may include a new upstream and/or downstream channel which are to be used by the cable modem 1106 for future communication with the CMTS, additionally the dynamic service request reply may also include any new SID parameters to be used by the cable modem for communicating with the Head End Complex via the newly assigned channel(s). Presumably, the new upstream and/or downstream channel(s) will be able to handle the additional bandwidth requested by the cable modem 1106.

According to a specific embodiment, the cable modem registration process may be handled by the same process which is performing the DOCSIS scheduling function for a particular upstream channel, which may also be the same process which controls the SID assignment for a particular upstream channel. Additionally, in specific embodiments, the load balancing process may be separate and independent from the DOCSIS scheduling process. For example, according to a specific implementation, one or more line cards may be responsible for implementing the load balancing functions, while other line cards may be configured to be responsible for implementing the DOCSIS scheduling functions. In a specific embodiment, a "master" line card which includes, for example, upstream channel 0 may be configured to implement the upstream load balancing functions for a particular upstream group or sub-domain. Similarly, the line card which includes downstream channel 0 may be configured to implement the downstream load balancing functions for a particular downstream grouping or sub-domain.

One advantage of the present invention is that it provides the ability to arbitrarily and dynamically create logical CMTS or DOCSIS domains which, in turn, facilitates load balancing operations by removing restrictions related to physical network topology. For example, in conventional DOCSIS systems, load balancing is typically not performed between line cards without requiring a cable modem to change domains and perform a complete substitution of its addressing and SID parameters. In contrast, the technique of the present invention allows load balancing to be performed between line cards at the CMTS without necessarily requiring the cable modem to change domains or perform a complete substitution of addressing for that cable modem.

Additionally, the technique of the present convention removes constraints for grouping upstream and downstream channels based upon physical network topology or line cards. Whereas in prior art systems the grouping of the upstream and/or downstream channels was dependent upon particular line card configurations, the technique of the present invention enables the CMTS to function as a pool of upstream and downstream resources which may be arbitrarily selected and grouped together to form logical domains and/or sub-domains.

CMTS Configurations

Generally, the dynamic CMTS domain assignment and MAP routing techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 7:
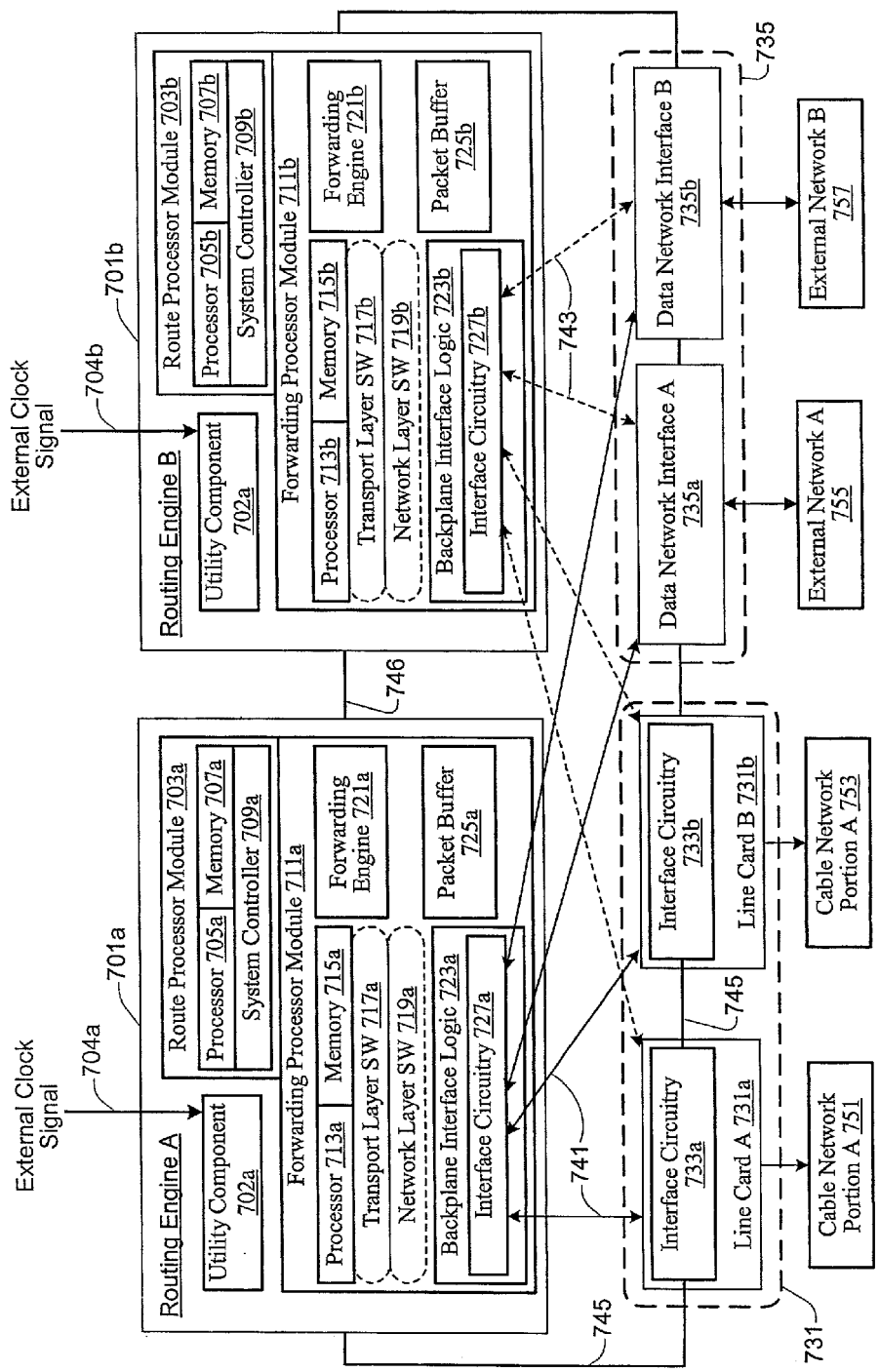
FIG. 7 shows a block diagram of a specific embodiment of a Cable Modem Termination System (CMTS) 700 which may be used to implement certain aspects of the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701*a*, 701*b*). In a specific implementation, Routing Engine A 701*a* may be configured as a primary or working routing engine, while Routing Engine B 701*b* may be configured as a backup or standby routing engine which provides redundancy functionality.

As shown in the embodiment of FIG. 7, each of the routing engines may include a variety of similar modules and/or components. In order to avoid confusion, the various components and/or modules relating to Routing Engine A 701*a* will now be described in greater detail with the understanding that such descriptions may also be applied to the corresponding components and modules of Routing Engine B 701*b*.

According to a specific embodiment, Routing Engine A may be configured or designed to include a plurality of functionally different modules or components, including, for example, a Forwarding Processor (FP) Module 711*a* adapted to provide packet forwarding functionality; a Route Processor (RP) Module 703*a* adapted to implement routing or forwarding operations; a utility component 702*a* adapted to provide system clock and timestamp functionality; etc. The routing engine components provide may be configured to provide layer one, layer two, layer three and layer four functionality as well as quality of service (QoS) functionality.

According to a specific implementation, the RP Module 703*a* may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703*a* comprises a general-purpose processor 705*a* (e.g., a MIPS route processor) coupled to a system controller 709*a* and memory 707*a*. It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 707*a* may comprise synchronous dynamic random access memory (SDRAM) storage locations addressable by the processor 705*a* for storing software programs and data structures accessed by the components. A network routing operating system, portions of which may reside in memory and executed by the route processor, functionally organizes the router by invoking network operations in support of software processes executing on the router.

The RP processor 705*a* may be configured to construct and load routing tables used by the FP Module 711*a*. The processor 705*a* may also be configured or designed to perform configuration management functions of the routing engine 701*a*, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727*a* may be coupled to the respective interface circuitry 733*a*, 733*b* of line cards 731*a*, 731*b*. According to a specific implementation, interface circuitry 727*a* may be configured to reside on a backplane logic circuit 723*a* of the routing engine. In one example, the backplane logic circuit 723*a* is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC), may be configured to further interface the line cards to a packet buffer 725a and a forwarding engine 721a of the FP Module 711a. The packet buffer 725a may include memory which is configured to store packets as the forwarding engine 721a performs its packet forwarding functions. For example, the packet buffer may be used to store low priority data packets while high priority, low latency voice packets are forwarded by the forwarding engine to a data network interface 735a. According to various embodiments, the FP Module 711 may comprise a processor 713a and memory 715a for handling transport layer 717 and network layer 719 functionality. In one implementation, the processor 713a may be configured to track accounting, port, and billing information for various users on a cable modem network 751. The processor 713a may also be configured to maintain desired service flow or session state information in memory 715a such as, for example, for voice calls initiated over the cable modem network. The FP Module 711a may also be configured to provide transaction compacting functionality, data parcel tunneling functionality, switching functionality, MAP routing functionality, load balancing functionality, etc.

According to a specific implementation, Routing Engine A 701a may be connected to Routing Engine B 701b via at least one link 746, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

According to a specific embodiment, the plurality of line cards may include different types of line cards which have been specifically configured to perform specific functions. For example, line cards 731 may correspond to radio-frequency (RF) line cards which have been configured or designed for use in a cable network. Additionally, line cards 735 may correspond to network interface cards which have been configured or designed to interface with different types of external networks (e.g. WANs, LANs,) utilizing different types of communication protocols (e.g. Ethernet, Frame Relay, ATM, TCP/IP, etc). For example, the data network interface 735a functions as an interface component between external data sources and the cable system. The external data sources transmit data to the data network interface 735a via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 719a.

According to a specific implementation, the operations associated with obtaining an IP address for cable modems may be implemented by the network layer software. This may involve the CMTS communicating with a DHCP server (not shown) via a data network interface, for example.

As shown in FIG. 7, at least a portion of the line cards includes interface circuitry for providing an appropriate interface between the host line card, other line cards, and/or the routing engine(s). For example, interface circuitry 733a may include interconnect ports coupled to one or more of the point-to-point links 741, 743. According to a specific implementation, the interface circuitry functions as a translator that converts conventional formats of data received at the line cards to a suitable protocol format for transmission from the line card to the appropriate routing engine. In one implementation, the interface circuitry 733a may also include circuitry to perform cyclic redundancy code (CRC) generation and checking on packets, along with interconnect format checking.

According to a specific embodiment, the point-to-point links 741, 743 may be configured as clock forwarded links such that each point-to-point link comprises a at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (701a, 701b) and a portion of the cable network. The data network interface 735a may couple the routing engine 701a to an external data network 755 such as, for example, the Internet.

According to one embodiment, all or selected lines cards, routing engines and/or data network interfaces may be configured to use at least one common dedicated line or backplane (e.g. 745). According to other embodiments, the routing engines 701a, 701b may have an additional dedicated connection(s) for supporting redundancy. In a specific implementation, the backplane may be configured as an Ethernet medium that is shared by the CMTS. When the line cards are inserted into the backplane, they communicate with the routing engines over the lines 745 in accordance with a "capabilities" exchange that identifies the types of line cards and their various characteristics/parameters.

According to a specific implementation, during initialization of the CMTS, the routing engines 701a and 701b negotiate for working routing engine status over the backplane. Assertion of working status causes the line cards 731 to configure their respective interface circuitry to communicate with the designated working routing engine (e.g.

Routing Engine A 701*a*). The Routing Engine A 701*a* then configures the CMTS and line cards, establishes routing relationships, and initiates traffic forwarding operations. The redundant routing engine 701*b* may complete a self-test and perform initialization of its various functions. The two routing engine assemblies may then exchange conventional negotiation messages (which may include, for example, health and status messages) via the backplane lines 745. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 701*b* detects that the primary routing engine has failed, the redundant routing engine may take over as the new working routing engine, and initiate a "cutover" operation to thereby cause the line card interface circuitry (e.g. 733*a*, 733*b*) to identify and communicate with the new working routing engine 701*b*. The new working routing engine 701*b* may then access and retrieve state information (such as, for example, telephone call state information, service flow state information, etc.) stored on selected line cards in order to maintain existing service flows.

Prior to a failure situation, the redundant routing engine 701*b* may be configured to monitor the status of the working routing engine 701*a*, and may further be configured or designed to receive updated configuration, transaction and/or state information, which may then be stored in an appropriate location in the redundant routing engine 701*b*.

The line cards may further comprise circuitry for "looping" packets back onto the redundant routing engine 701*b* over the point-to-point links. This allows the redundant routing engine 701*b* to send and receive test packets to evaluate its own operation in addition to the operation of the dedicated lines prior to the occurrence of a system failure.

The dynamic CMTS domain assignment and MAP routing techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 7 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 707*a*, 715*a*, etc.) configured to store program instructions for the network operations and other functions of the present invention described herein. The program instructions may specify an operating system and one or more applications, for example. Such memory or memories may also be configured to store data structures (such as, for example, those described in FIGS. 6B, 6C, 10B, 10C) and/or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
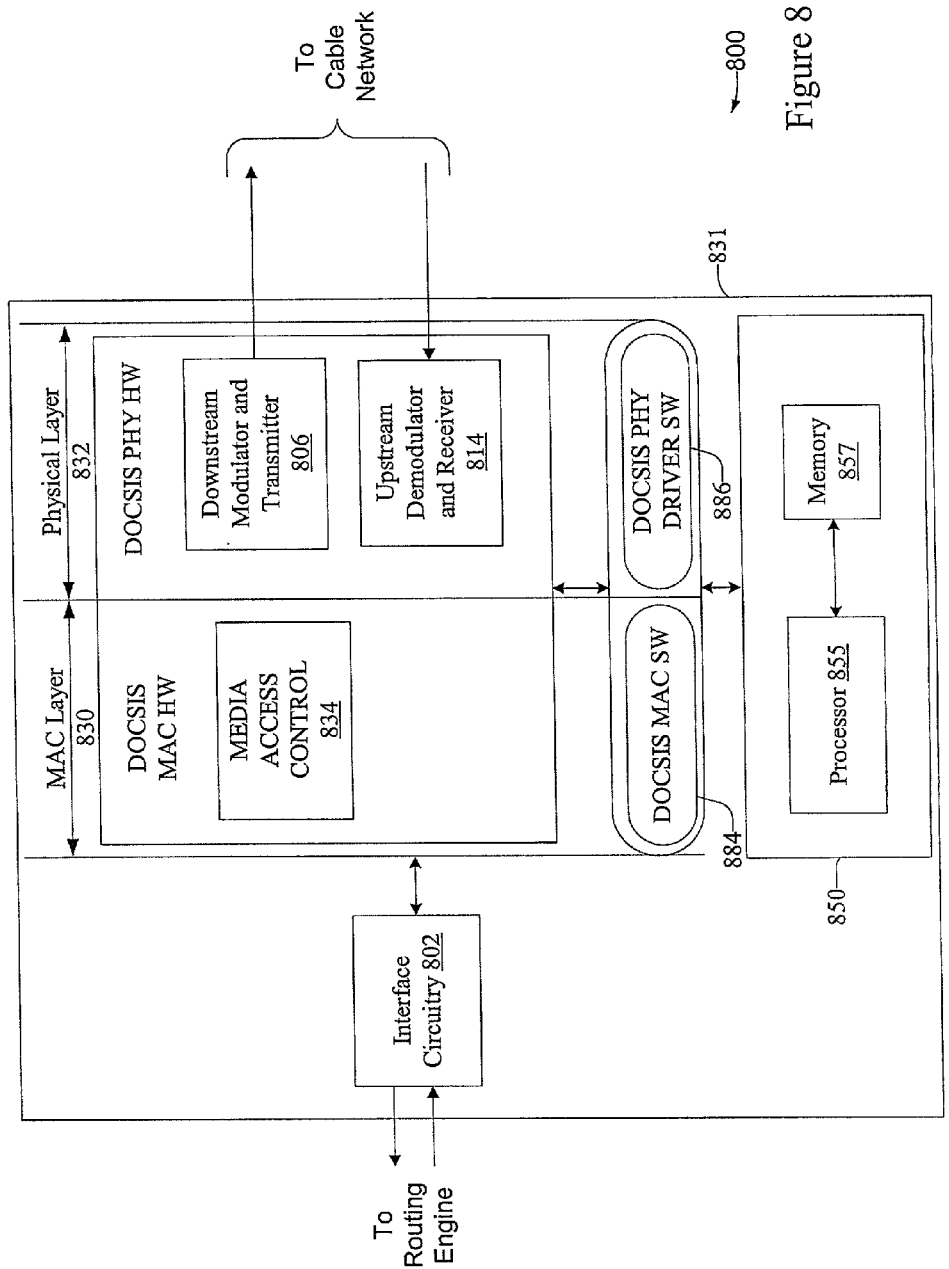
FIG. 8 shows a specific embodiment of a line card 800 which may be used for implementing certain aspects of the present invention.

FIG. 8 shows a specific embodiment of a line card 800 which may be used for implementing certain aspects of the present invention. According to a specific embodiment, the line card 800 may be configured or designed to implement selected aspects of the DOCSIS functionality which were conventionally implemented by the CMTS, such as, for example, DOCSIS MAC functionality.

In the specific embodiment as shown in FIG. 8, line card 800 provides functions on several network layers, including a physical layer 832, and a Media Access Control (MAC) layer 830. Generally, the physical layer is responsible for receiving and transmitting RF signals on the cable plant. Hardware portions of the physical layer include at least one downstream modulator and transmitter 806 and/or at least one upstream demodulator and receiver 814. The physical layer also includes software 886 for driving the hardware components of the physical layer.

Upstream optical data signals (packets) arriving via an optical fiber node are converted to electrical signals, and then demodulated by the demodulator/receiver 814. The demodulated information is then passed to MAC layer block 830.

A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 830 includes a MAC hardware portion 834 and a MAC software portion 884. The MAC layer software portion may include software relating to DOCSIS MAC functionality, MAP routing functionality, etc. The MAC layer hardware and software portions operate together to provide the above-described DOCSIS MAC functionality. In a preferred embodiment, MAC controller 834 is dedicated to performing some MAC layer functions, and is distinct from processor 855.

After MAC layer block 830 has processed the upstream information, it is then passed to interface circuitry 802. As described previously, interface circuitry 802 includes the appropriate hardware and/or software for converting data formats received at the line cards to a suitable protocol format for transmission from the line card to an appropriate routing engine.

When a packet is received from the routing engine at the interface circuitry 802, the packet is then passed to MAC layer 830. The MAC layer 830 transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown).

As shown in FIG. 8, line card 800 includes a central hardware block 850 including one or more processors 855 and memory 857. These hardware components interact with software and other hardware portions of the various layers within the line card. They provide general purpose computing power for much of the software. Memory 857 may include, for example, I/O memory (e.g. buffers), program memory, shared memory, etc. One or more data structures used for implementing the techniques of the present invention may reside in such memory. In one embodiment, the software entities 882, 884, and 886 are implemented as part of a network operating system running on hardware 850. Preferably, at least a part of the dynamic CMTS domain assignment and MAP routing functionality of this invention are implemented in software as part of the operating system. In FIG. 8, such software may be part of MAC layer software 884, or may be closely associated therewith. Of course, the dynamic CMTS domain assignment and MAP routing logic of the present invention could reside in hardware, software, or some combination of the two.

According to a specific implementation, the procedures typically employed by the CMTS during registration and pre-registration may be performed at the MAC layer of the line card 800. In such an embodiment, most of the registration operations may be performed by the hardware and software provided for MAC layer logic 830.

The load balancing functions and MAP routing functions of the present invention may be implemented using a number of different system implementations. For example, as shown in FIGS. 7 and 8 of the drawings, the load balancing and MAP routing processes may be implemented at a central processor (e.g. 705a), or may be implemented by specific line card processor(s) 855. According to a specific implementation, the line card processor 855 may also be configured to generate MAP messages for upstream channels associated with that line card or with other line cards residing at the CMTS. Additionally, according to a specific implementation, the scheduling of MAP messages may be performed by the processor 855 residing on one or more separate line cards within a given DOCSIS domain. In this implementation, the central processor (e.g. 705a) may be configured to handle IP related processing, while the line card processor 855 may be configured to handle load balancing and/or MAP routing processes.

Figure 13:
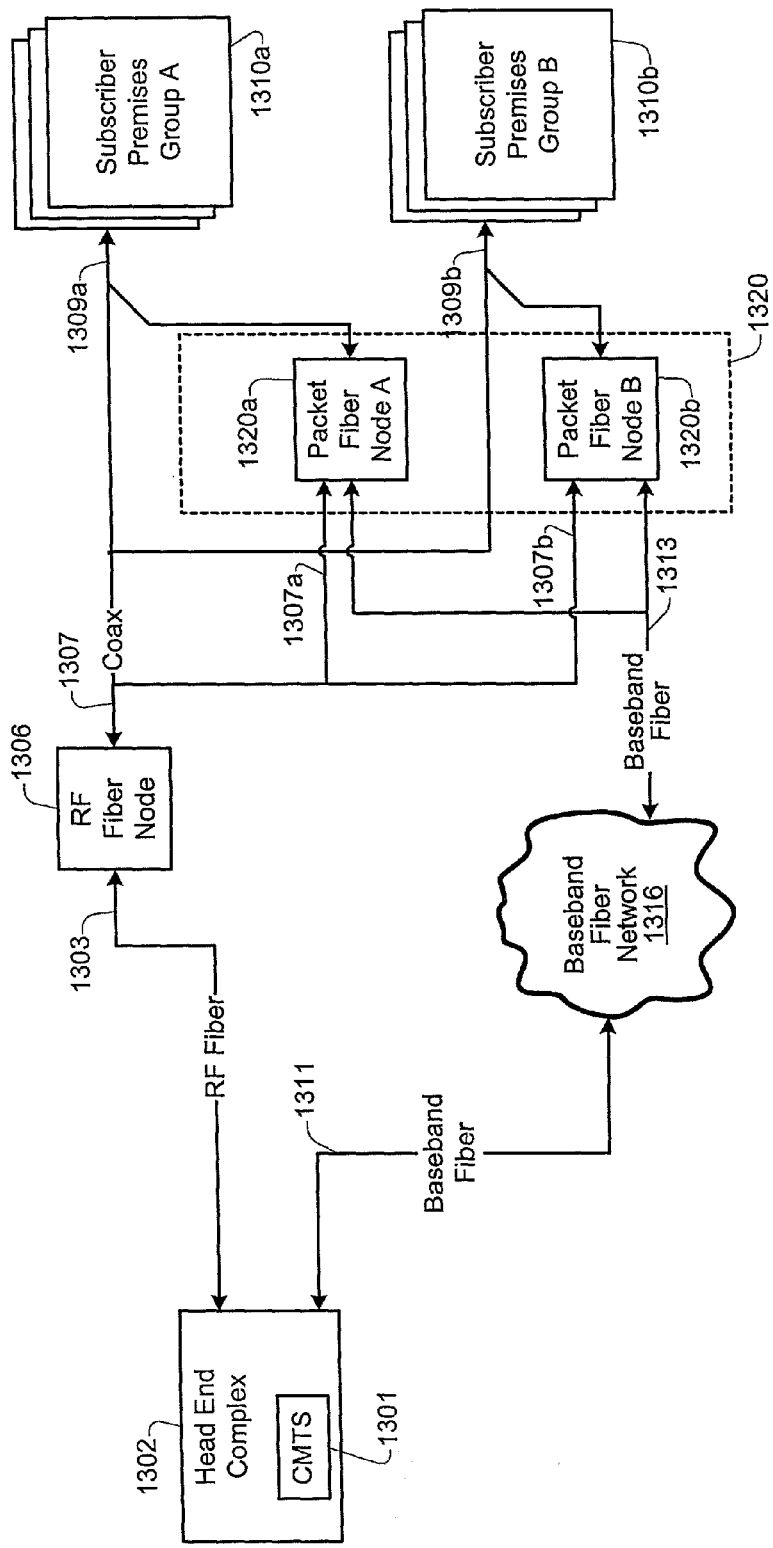
FIGS. 13 and 14 illustrate specific embodiments of cable networks which may be used for implementing various aspects of the present invention.
Figure 14:
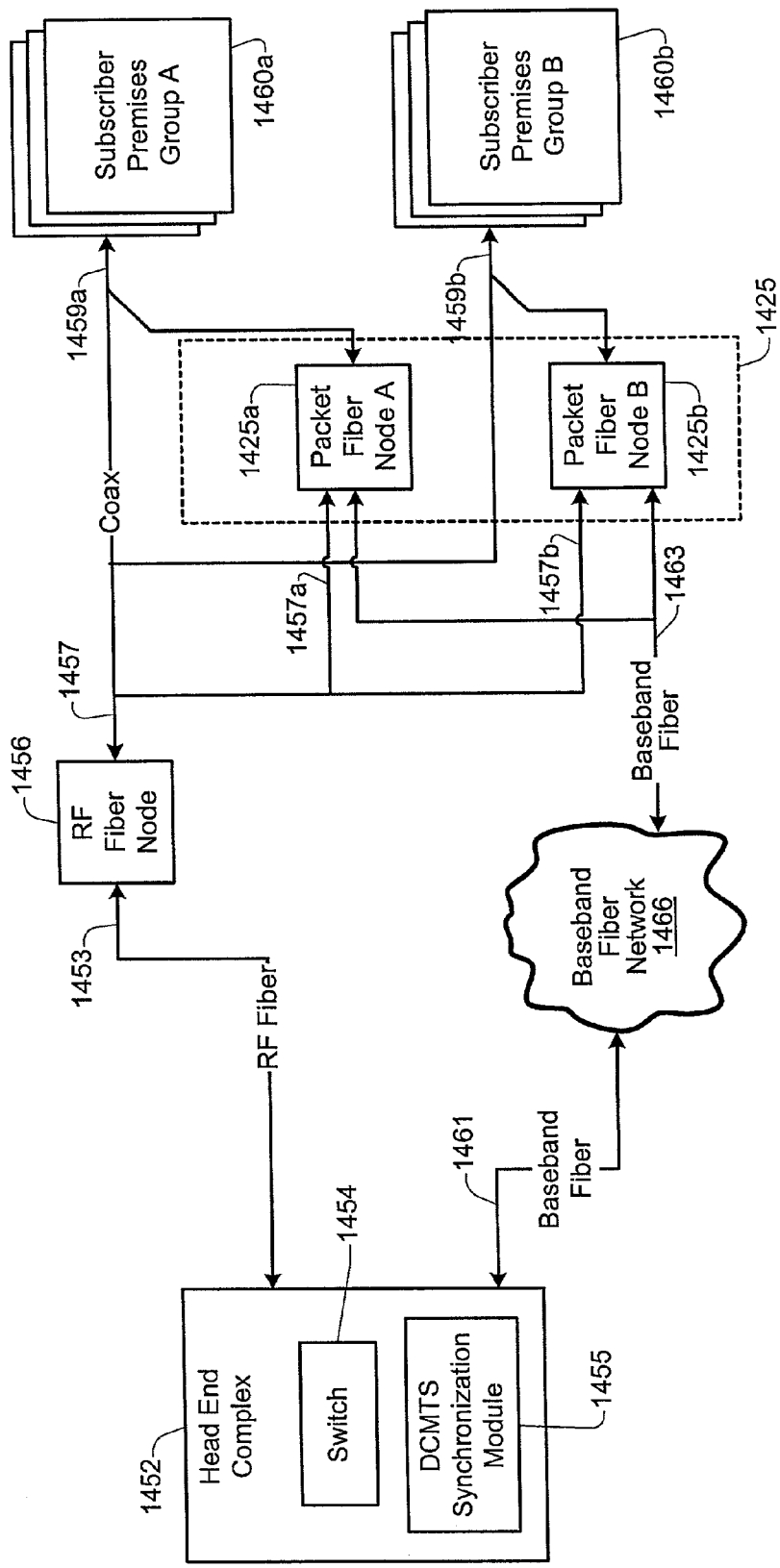

It will be appreciated that, according to a specific embodiments, at least a portion of functions described herein which are performed by the CMTS (e.g. FIG. 7), line cards (e.g. FIG. 8), or selected components thereof, may be implemented in a centralized CMTS system (e.g. residing the Head End Complex of the cable network, as shown, for example, in FIG. 13), and/or may be implemented at one or more distributed CMTS (DCMTS) systems (e.g. residing at one or more fiber nodes, as shown, for example, in FIG. 14).

OTHER EMBODIMENTS

FIGS. 13 and 14 illustrate specific embodiments of cable networks which may be used for implementing various aspects of the present invention. In the embodiment of FIG. 13, the Head End complex 1302 includes a centralized CMTS device 1301 which may be configured to implement DOCSIS functionality. A specific embodiment of the CMTS 1301 is described in greater detail below with respect to FIGS. 7 and 8 of the drawings.

As show in FIG. 13, the cable network 1300 includes two different types of fiber nodes, namely RF fiber nodes (e.g. 1306), and packet fiber nodes (e.g. 1320a, 1320b). According to a specific embodiment, the RF fiber node 1306 may be configured as a conventional fiber node such as fiber nodes 106 of FIG. 1. According to a specific implementation, the RF fiber node 1306 may be configured to handle all legacy RF downstream and upstream communications (such as, for example, set-top box signals, telemetry signals, etc., and communications which occur on centralized DOCSIS channels), and may be configured to perform additional functions associated with conventional fiber nodes.

As shown in the embodiment of FIG. 13, a baseband fiber network 1316 may be deployed which is coupled to the conventional cable network. The baseband fiber network may include a plurality of packet fiber nodes 1320, which are also coupled to the conventional fiber network. Each packet fiber node may be inserted into the cable network 1300 using a combiner and/or splitter which may be used to add and/or separate DOCSIS signals into/from the RF lineup.

Communication between the Head End Complex 1302 and the plurality of packet fiber nodes 1320 may be accomplished via the baseband fiber network 1316. For example, according to a specific implementation, one or more IP tunnels may be formed between the Head End Complex 1302 and the plurality of packet fiber nodes 1320 in order to allow for transmission and reception of IP packets. In a specific implementation, the IP tunnel(s) may be formed between the CMTS 1301 and a DCMTS (residing at one or more packet fiber nodes). The CMTS 1301 may be configured to handle layer 3 functionality, including packet-related decisions, network layer decisions, IP related decisions, etc. Additionally, according to a specific implementation, the CMTS may also be responsible for handing redundancy and/or failover functionality for selected DCMTS devices.

According to specific embodiments of the present invention, each packet fiber node may include a distributed CMTS device (herein referred to as a "DCMTS"), which is configured to receive and transmit baseband optical signals from/to the Head End Complex 1302 via baseband fiber network 1316. According to a specific implementation, the DCMTS may be configured to perform conversions between packet protocols implemented over the baseband fiber media (e.g. 1311, 1313) and DOCSIS protocols implemented on the coax media (e.g. 1309a, 1309b). According to a specific embodiment, the functionality of the DCMTS may include all or a selected portion of the functionality provided by a conventional CMTS device. For example, the DCMTS may perform, at a relatively local level, at least a portion of the scheduling or MAC functions typically performed by conventional CMTS devices residing at the Head End complex.

Additionally, the DCMTS may be configured to handle layer 1 and layer 2 functionality such as the OSI layer management (e.g. physical layer, RF layer, hardware), MAC layer management, data link layer management, framing functionality, DOCSIS protocol functionality, timestamp functionality, etc.

According to a specific implementations of the present invention, the packet fiber nodes may be pushed deeper into the network (i.e. closer to the subscriber groups) than conventional RF fiber nodes, which, as illustrated in FIG. 13, may result in a plurality of packet fiber nodes 1320 servicing subscriber groups (e.g. 1310*a*, 1310*b*) which are serviced by a single RF fiber node 1306. For example, the RF fiber node 1306 may be configured to service 1300 households past (HHP) while each packet fiber node may be configured to service 100 households past, resulting in 2 packet fiber nodes (1320*a*, 1320*b*) servicing the 1300 households which are serviced by the RF fiber node 1306.

In addition to being configured to receive baseband optical signals, the packet fiber nodes 1320 may also be configured to receive electrical signals from the RF fiber nodes via coax lines (e.g. 1307A, 1307B). Such electrical signals may include, for example, clock or other timing reference signals and/or timestamp synchronization signals.

FIG. 14 shows an alternate embodiment of a cable network 1450 which may be used for implementing the dynamic CMTS domain assignment and MAP routing technique of the present invention. In the cable network of FIG. 14, the centralized CMTS typically residing at the Head End complex 1452 has been removed, and its functionality incorporated into selected DCMTS devices residing in the packet fiber nodes 1425. Thus, according to the embodiment of FIG. 14, selected DCMTS devices residing in the packet fiber nodes 1425 may be configured to implement the functions typically implemented by the centralized CMTS device, such as, for example, layer 3 functionality and/or at least a portion of the functionality performed by the various logic described with respect to FIGS. 7 and 8 of the drawings.

According to a specific embodiment, communication of IP packets between the Head End complex 1452 and the plurality of packet fiber nodes 1455 may be accomplished without the use of a tunneling protocol. In such an embodiment, communication between network devices may be accomplished using, for example, a standardized IP protocol. Additionally, as shown in the embodiment of FIG. 14, the Head End complex 1452 may include a switch 1454 (e.g. Ethernet switch), or other type of traffic handling device which may be configured to route or forward traffic between network devices in the cable network 1450, or between the devices in the cable network and devices in external networks. Further, as shown in the example of FIG. 14, the Head End complex may also include a DCMTS Synchronization Module 1455 which may be configured to provide synchronized clock reference signals and/or synchronized timestamp information to the plurality of packet fiber nodes 1425.

While the discussion to this point has focused on dynamic CMTS domain assignment and MAP routing techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing dynamic CMTS domain assignment and MAP routing capability in a network having at least one traffic handling device (e.g., another switch or router) that provides normal service to a host. In the wireless system (e.g., represented by FIG. 12) the plurality of nodes or hosts corresponds to the plurality of wireless nodes 1250 which use at least one shared access channel to communicate with at least one access control system 1222 located at the Head End of the wireless system.

Figure 12:
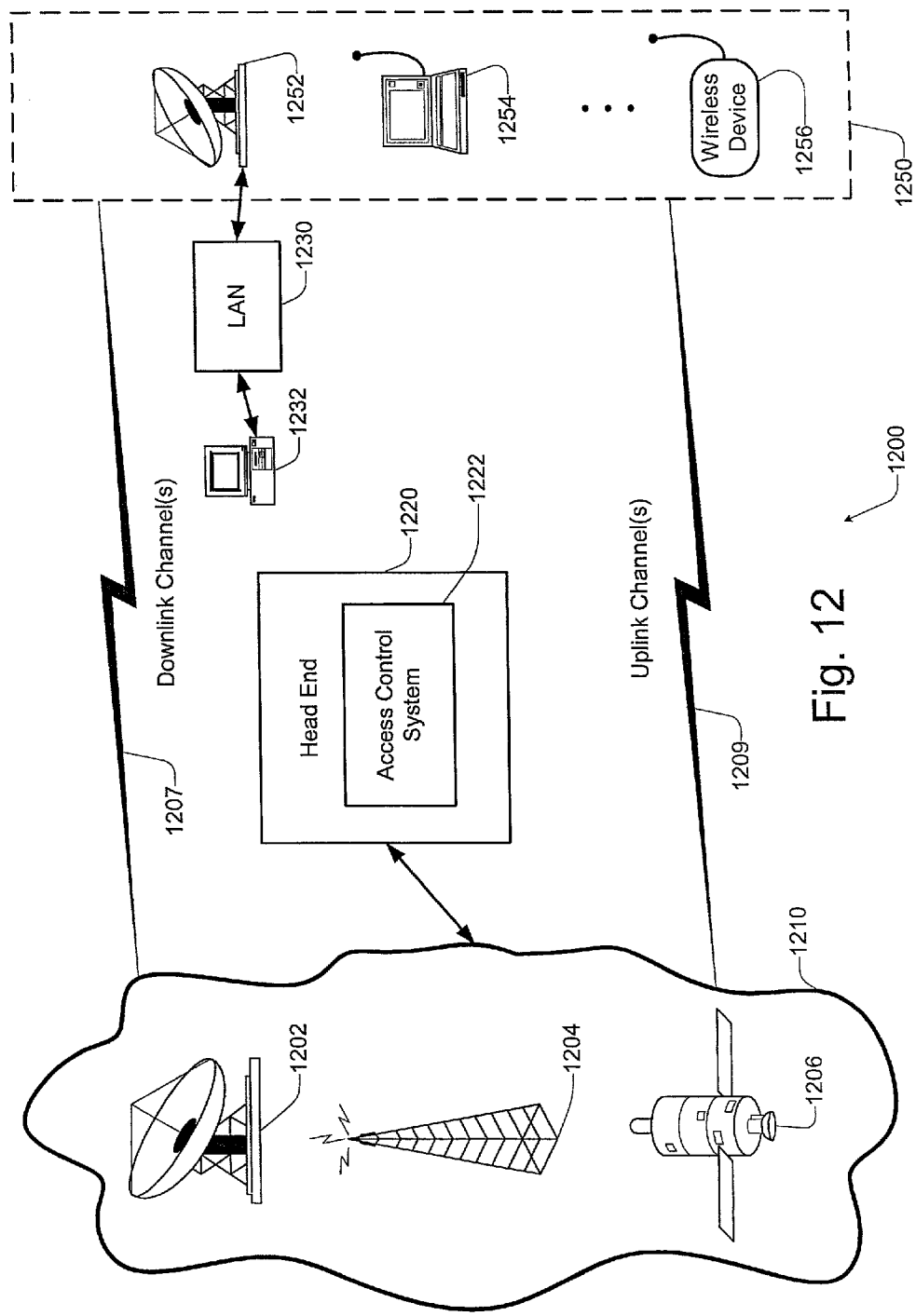
FIG. 12 shows a block diagram of wireless network which may be used for implementing the technique of the present invention.

FIG. 12 shows an example of a wireless data communication system 1200 which may be used for implementing the techniques of the present invention. As shown in FIG. 12, the wireless system includes a central termination system (or Head End) 1220. The Head End includes an access controller or access control system (ACS) 1222 which communicates with a plurality of wireless nodes 1250, and coordinates access between each of the wireless nodes and the Head End 1220. The access controller 1222 may include memory and at least one processor. In a specific embodiment, the function of the access controller 1222 is analogous to that of the CMTS described above with respect to cable modem networks. It may serve as a router or switch as well.

The Head End 1220 communicates with a plurality of wireless nodes 1250 via any one of a plurality of wireless transmitting and receiving devices 1210. As shown in FIG. 12, for example, the plurality of wireless transmitting and receiving devices 1210 may include satellite base stations 1202, orbital satellites 1206, radio towers 1204, etc.

In a specific embodiment which is analogous to that of cable modem networks, the Head End 1220 of the wireless computer system communicates with the plurality of nodes 1250 via one or more downlink channels 1207 and one or more uplink channels 1209. Each downlink channel 1207 is a broadcast-type channel utilized by the Head End to communicate with an associated group of wireless nodes within the wireless network. The uplink channel 1209 is a shared-access channel, which is utilized by a group of wireless nodes (analogous to cable modems) to communicate with the Head End 1220. The access controller 1222 stores registration parameters for the various nodes that it services. It may also store the IP addresses for nodes that it services.

In a specific embodiment of the present invention, the registration process and information is similar to that of the cable network CMTSs described above. Moreover, the techniques of the present invention for dynamic CMTS domain assignment and MAP routing capability over a shared access data network may be implemented in wireless system 1200.

The wireless devices or nodes 1250 may include any one of a number of wireless transmitting/receiving devices. For example, a satellite dish 1252 may be used to communicate with the Head End 1220 via the uplink and downlink channels. The satellite dish may, in turn, be connected to a local area network (LAN) 1230 which, may be further connected to one or more computer systems 1232. Another wireless device may be a portable/wireless computer system 1254, which is able to transmit and receive information to the Head End via uplink and downlink channels 1207 and 1209. Other wireless devices 1256 may include, for example, wireless telephones, handheld computing devices, etc.

In specific embodiments where the uplink and downlink channels within the wireless system 1200 are utilized in a manner similar to that of the upstream and downstream channels of a cable modem network, the above-described dynamic CMTS domain assignment and MAP routing techniques may easily be implemented in wireless system 1200 using the detailed description of the present invention provided herein. Moreover, the techniques of the present invention may be easily implemented in any computer network which uses shared access channels for communicating between a centralized computing system and one or more remote nodes.

It will be appreciated that the techniques of the present invention are not limited to cable networks, and may be applied to any access data network which uses at least one shared access communication channel to communicate between a plurality of nodes in the network and a Head End of the network.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for defining service flow identifiers in an access network, wherein each service flow identifier is usable for identifying a specific node in the access network, the access network including at least one upstream channel and at least one downstream channel for communicating with a selected portion of the nodes, the access network further including a Head End, the Head End including at least one interface for accessing the upstream and downstream channels, the method comprising:
   defining a plurality of service flow identifier groups;
   wherein each service flow identifier group includes a plurality of different service flow identifiers; and
   wherein each service flow identifier group is defined independently from any defined domain of upstream and downstream channels.

2. The method of claim 1 wherein each service flow identifier group is associated with a different upstream channel in the access network.

3. The method of claim 1 wherein each group of service flow identifiers corresponds to a pool service flow identifier for a selected upstream channel.

4. The method of claim 1 wherein a first service flow identifier group is associated with a first upstream channel;
   wherein a second service flow identifier group is associated with a second upstream channel;
   wherein the method further comprises:
   assigning a first service flow identifier from the first service flow identifier group to a first node which is using the first upstream channel to communication with the Head End; and
   assigning a second service flow identifier from the second service flow identifier group to a second node which is using the second upstream channel to communication with the Head End.

5. The method of claim 4 wherein the first and second upstream channels are members of different domains.

6. The method of claim 4 wherein the first upstream channel is configured to communicate with a first interface at the Head End; and
   wherein the second upstream channel is configured to communicate with a second interface at the Head End, different from the first interface.

7. The method of claim 1 further comprising:
   identifying a particular upstream channel used by a selected node to communicate with the Head End; and
   assigning a first service flow identifier to the selected node;
   wherein the fit service flow identifier is selected from the service flow identifier group associated with the particular upstream channel.

8. The method of claim 1 wherein said access network is a cable network implemented in accordance with a DOCSIS standardized protocol, and wherein said nodes are cable modems.

9. A system implemented at the Head End of an access network, the access network including at least one upstream channel and at least one downstream channel for communicating with network nodes, the system comprising:
   at least one processor;
   memory; and
   at least one interface for accessing the upstream and downstream channels,
   the system being configured or designed to define a plurality of service flow identifier groups;
   wherein each service flow identifier group includes a plurality of different service flow identifiers, each service flow identifier being useable for identifying a specific node in the access network; and
   wherein each service flow identifier group is defined independently from any defined domain of upstream and downstream channels.

10. The system of claim 9 being further configured or designed to associate each service flow identifier group with a different upstream channel in the access network.

11. The system of claim 9 wherein each group of service flow identifiers corresponds to a pool service flow identifier for a selected upstream channel.

12. The system of claim 9 wherein a first service flow identifier group is associated with a first upstream channel;
   wherein a second service flow identifier group is associated with a second upstream channel;
   wherein the system is further configured or designed to assign a first service flow identifier from the first service flow identifier group to a first node which is using the first upstream channel to communication with the Head End; and
   wherein the system is further configured or designed to assign a second service flow identifier from the second service flow identifier group to a second node which is using the second upstream channel to communication with the Head End.

13. The system of claim 12 wherein the first and second upstream channels are members of different domains.

14. The system of claim 12 wherein the first upstream channel is configured to communicate with a first interface at the Head End; and
   wherein the second upstream channel is configured to communicate with a second interface at the Head End, different from the first interface.

15. The system of claim 9,
   wherein the system is further configured or designed to identify a particular upstream channel used by a selected node to communicate with the Head End;
   wherein the system is further configured or designed to assign a first service flow identifier to the selected node; and
   wherein the first service flow identifier is selected from the service flow identifier group associated with the particular upstream channel.

16. The system of claim 9 wherein said access network is a cable network implemented in accordance with a DOCSIS standardized protocol, wherein said nodes are cable modems, and wherein the system corresponds to a cable modem termination system CMTS.

17. A system for defining service flow identifiers in an access network, wherein each service flow identifier is usable for identifying a specific node in the access network, the access network including at least one upstream channel and at least one downstream channel for communicating with a selected portion of the nodes, the access network further including a Head End, the Head End including at least one interface for accessing the upstream and downstream channels, the system comprising:
   means for defining a plurality of service flow identifier groups;
   wherein each service flow identifier group includes a plurality of different service flow identifiers;
   means for associating each service flow identifier group with a respective, different upstream channel in the access network; and
   means for defining each service flow identifier group independently from any defined domain of upstream and downstream channels.

18. The system of claim 17 wherein each group of service flow identifiers corresponds to a pool service flow identifier for a selected upstream channel.

19. The system of claim 17 wherein a first service flow identifier group is associated with a first upstream channel;
   wherein a second service flow identifier group is associated with a second upstream channel;
   wherein the system further comprises:
   means for assigning a first service flow identifier from the first service flow identifier group to a first node which is using the first upstream channel to communication with the Head End; and
   means for assigning a second service flow identifier from the second service flow identifier group to a second node which is using the second upstream channel to communication with the Head End.

20. The system of claim 19 wherein the first and second upstream channels are members of different domains.

21. The system of claim 19 wherein the first upstream channel is configured to communicate with a first interface at the Head End; and
   wherein the second upstream channel is configured to communicate with a second interface at the Head End, different from the first interface.

22. The system of claim 17 further comprising:
   means for identifying a particular upstream channel used by a selected node to communicate with the Head End; and
   means for assigning a first service flow identifier to the selected node;
   wherein the first service flow identifier is selected from the service flow identifier group associated with the particular upstream channel.

23. The system of claim 17 wherein said access network is a cable network implemented in accordance with a DOCSIS standardized protocol, and wherein said nodes are cable modems.

24. A method for defining service flow identifiers in an access network, wherein each service flow identifier is usable for identifying a specific node in the access network, the access network including at least one upstream channel and at least one downstream channel for communicating with a selected portion of the nodes, the access network further including a Head End, the Head End including at least one interface for accessing the upstream and downstream channels, the method comprising:
   defining a plurality of service flow identifier groups;
   wherein each service flow identifier group includes a plurality of different service flow identifiers;
   wherein each service flow identifier group is associated with a respective, different upstream channel in the access network; and
   wherein each service flow identifier group is defined independently from any defined domain of upstream and downstream channels.

25. A system implemented at the Head End of an access network, the access network including at least one upstream channel and at least one downstream channel for communicating with network nodes, the system comprising:
   at least one processor;
   memory; and
   at least one interface for accessing the upstream and downstream channels,
   the system being configured or designed to define a plurality of service flow identifier groups;
   wherein each service flow identifier group includes a plurality of different service flow identifiers, each service flow identifier being useable for identifying a specific node in the access network;
   wherein each service flow identifier group is defined independently from any defined domain of upstream and downstream channels; and
   wherein the system is operable to associate each service flow identifier group with a respective, different upstream channel in the access network.

* * * * *